United States Patent
Celozzi et al.

(10) Patent No.: US 11,362,936 B2
(45) Date of Patent: Jun. 14, 2022

(54) DATAPATH PROVISION IN SOFTWARE DEFINED NETWORKS

(71) Applicant: Telefonaktiebolaget LM Ericsson (publ), Stockholm (SE)

(72) Inventors: Giuseppe Celozzi, Pagani (IT); Luca Baldini, Pagani (IT); Daniele Gaito, Pagani (IT); Gaetano Patria, Pagani (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/318,461

(22) PCT Filed: Jul. 19, 2016

(86) PCT No.: PCT/EP2016/067211
§ 371 (c)(1),
(2) Date: Jan. 17, 2019

(87) PCT Pub. No.: WO2018/014944
PCT Pub. Date: Jan. 25, 2018

(65) Prior Publication Data
US 2019/0238454 A1 Aug. 1, 2019

(51) Int. Cl.
*H04L 12/725* (2013.01)
*H04L 12/24* (2006.01)
(Continued)

(52) U.S. Cl.
CPC ........ *H04L 45/306* (2013.01); *H04L 41/0806* (2013.01); *H04L 45/04* (2013.01); *H04L 45/64* (2013.01); *H04W 24/02* (2013.01)

(58) Field of Classification Search
CPC ....... H04L 45/306; H04L 45/64; H04L 45/04; H04L 41/0806; H04W 24/02
(Continued)

(56) References Cited

U.S. PATENT DOCUMENTS 9,038,151 B1* 5/2015 Chua ................ H04L 47/10 726/1
9,143,557 B2* 9/2015 Guichard ............ H04L 67/1008
(Continued)

FOREIGN PATENT DOCUMENTS

EP  2 680 540 A1   1/2014
EP  2680540 B1 *  1/2014  ............. H04L 29/08
(Continued)

OTHER PUBLICATIONS

Openflow Switch Specification, Open Networking Foundation; Version 1.3.0 (Wire Protocol 0.04)—Jun. 25, 2012.
(Continued)

*Primary Examiner* — David R Lazaro
*Assistant Examiner* — Berhanu Shitayewoldetadik
(74) *Attorney, Agent, or Firm* — Baker Botts LLP

(57) ABSTRACT

A Software Defined Network (SDN) comprises a plurality of resources including Network Elements (NEs) and network links connecting the NEs. A method comprises receiving a request to provision an SDN Datapath in the SDN. The request comprises performance metrics for the SDN Datapath and a geographic constraint to be applied to resources used in provisioning the SDN Datapath. The method further comprises assembling a candidate set of resources to provision the SDN Datapath and initiating provision of the SDN Datapath using resources selected from the candidate set. Assembling a candidate set of resources to provision the SDN Datapath comprises obtaining a geographic location attribute of resources in the SDN and populating the candidate set with those resources having a geographic location attribute satisfying the received geographic constraint.

13 Claims, 11 Drawing Sheets

(51) Int. Cl.
  *H04L 12/715* (2013.01)
  *G06F 15/16* (2006.01)
  *H04L 12/721* (2013.01)
  *H04L 12/46* (2006.01)
  *H04L 12/26* (2006.01)
  *G06F 15/173* (2006.01)
  *G06F 9/50* (2006.01)
  *H04L 45/302* (2022.01)
  *H04W 24/02* (2009.01)
  *H04L 45/64* (2022.01)
  *H04L 41/0806* (2022.01)
  *H04L 45/02* (2022.01)

(58) Field of Classification Search
  USPC .......................................................... 709/223
  See application file for complete search history.

(56) References Cited

U.S. PATENT DOCUMENTS

| | | | |
|---|---|---|---|
| 9,450,817 B1* | 9/2016 | Bahadur | H04L 41/0813 |
| 9,819,540 B1* | 11/2017 | Bahadur | H04L 45/50 |
| 10,218,776 B2* | 2/2019 | Llorca | G06F 9/45558 |
| 2007/0147243 A1* | 6/2007 | He | H04L 47/15 |
| | | | 370/230 |
| 2012/0147824 A1* | 6/2012 | Van der Merwe | H04W 84/02 |
| | | | 370/329 |
| 2013/0336126 A1* | 12/2013 | Vasseur | H04L 41/147 |
| | | | 370/235 |
| 2014/0003232 A1* | 1/2014 | Guichard | H04L 67/1029 |
| | | | 370/230 |
| 2014/0016467 A1* | 1/2014 | Bernstein | H04L 45/124 |
| | | | 370/235 |
| 2014/0089506 A1* | 3/2014 | Puttaswamy Naga | |
| | | | H04L 63/1458 |
| | | | 709/225 |
| 2014/0192645 A1* | 7/2014 | Zhang | H04L 47/724 |
| | | | 370/235 |
| 2014/0280898 A1 | 9/2014 | Voit et al. | |
| 2015/0040127 A1* | 2/2015 | Dippenaar | G06F 9/5088 |
| | | | 718/1 |
| 2015/0288767 A1* | 10/2015 | Fargano | H04L 12/4625 |
| | | | 709/227 |
| 2015/0319078 A1* | 11/2015 | Lee | H04L 12/6418 |
| | | | 370/392 |
| 2015/0334696 A1* | 11/2015 | Gu | G06F 9/45558 |
| | | | 718/1 |
| 2015/0358236 A1* | 12/2015 | Roach | H04L 43/062 |
| | | | 370/235 |
| 2016/0006606 A1* | 1/2016 | Zhu | H04L 65/4084 |
| | | | 370/338 |
| 2016/0013985 A1* | 1/2016 | Reddy | H04L 63/0892 |
| | | | 726/4 |
| 2016/0057102 A1* | 2/2016 | Wei | H04L 61/2007 |
| | | | 709/226 |
| 2016/0080263 A1* | 3/2016 | Park | G06F 16/245 |
| | | | 370/392 |
| 2016/0105489 A1* | 4/2016 | Llorca | H04L 67/04 |
| | | | 709/226 |
| 2016/0142510 A1* | 5/2016 | Westphal | H04L 67/322 |
| | | | 709/219 |
| 2016/0164787 A1* | 6/2016 | Roach | H04L 41/0896 |
| | | | 370/235 |
| 2016/0234349 A1* | 8/2016 | Bihannic | H04L 69/08 |
| 2016/0301598 A1* | 10/2016 | Strijkers | H04L 67/327 |
| 2017/0272380 A1* | 9/2017 | Rao | H04L 47/823 |
| 2017/0324781 A1* | 11/2017 | Hu | H04L 63/14 |
| 2017/0345281 A1* | 11/2017 | Shaw | H04L 41/0681 |
| 2018/0337823 A1* | 11/2018 | Zhang | H04L 41/0806 |

FOREIGN PATENT DOCUMENTS

| | | |
|---|---|---|
| EP | 2 961 100 A1 | 12/2015 |
| WO | 2013185796 A1 | 12/2013 |
| WO | 2017 202475 A1 | 11/2017 |
| WO | WO-2017199099 A1 * | 11/2017 |

OTHER PUBLICATIONS

SDN Architecture; Open Networking Foundation; Issue 1, ONF TR-502—Jun. 2014.
International Search Report for International application No. PCT/EP2016/067211—dated Mar. 14, 2017.
Software-Defined Networking (SDN): Layers and Architecture Terminology; Internet Research Task Force (IRTF); Request for Comments: 7426; Category: Informational; ISSN: 2070-1721 by E. Haleplidis, ed et al.—Jan. 2015.
Communication Pursuant to Article 94(3) EPC issued for Application No. 16 742 243.5-1216—dated Apr. 17, 2020.

* cited by examiner

DATAPATH PROVISION IN SOFTWARE DEFINED NETWORKS

PRIORITY

This nonprovisional application is a U.S. National Stage Filing under 35 U.S.C. § 371 of International Patent Application Serial No. PCT/EP2016/067211 filed Jul. 19, 2016 and entitled "Datapath Provision in Software Defined Networks" is hereby incorporated by reference in its entirety.

TECHNICAL FIELD

The present invention relates to a method in a Software Defined Network (SDN) in which provision of a requested SDN Datapath is initiated, and to a method for configuring a Secure Domain in an SDN. The present invention also relates to apparatus and to a computer program and a computer program product configured, when run on a computer, to carry out methods in an SDN.

BACKGROUND

Software Defined Networking refers to an approach for network programmability in which network control and data forwarding functions are separated, with control functions centralised in one or more software implemented SDN controllers. Software Defined Networking affords the capacity to initialize, control, change, and manage network behaviour dynamically via open interfaces. The centralised network Control Layer of SDN architectures allows for flexible and efficient network management, and also, through dynamic and automated programming, facilitates the optimisation of network resources. The separation of control and data functions allows for faster innovation cycles in both Control and Data layers.

FIGS. 1 and 3 illustrate example SDN architectures in which core functions of the network are concentrated in SDN controllers in the Control Layer. Service providers communicate network requirements and required network behaviour to SDN controllers via Applications in the Application Layer. These requirements, received over standardised interfaces between the Application and Control Layers, are translated by the SDN controllers and enforced via standardised interfaces between the SDN controllers in the Control Layer and the individual Network Elements (NEs) in the Infrastructure Layer. Service providers thus gain network control independence from network equipment vendors, and can initialise network nodes through simple programming, as opposed to manually configuring individual elements. The centralised functions of the SDN controller can also be used to promptly handle network issues and greatly reduce the time needed to provide a new network service or application.

As illustrated in FIG. 2, SDN architectures provide Application Programming Interfaces (APIs), enabling users to implement customised services for certain purposes including switching, routing, network resource allocation, bandwidth management, traffic engineering, system optimization, Quality of Service (QoS), security, access control lists (ACLs) and policy management.

Within individual SDN controllers, Traffic Engineering (TE) information is exchanged, allowing for the population of a Traffic Engineering Database (TED). The TED contains resource attribute information and network topology information for the domain or domains in the network under the authority of the SDN controller. Resource attributes may include bandwidth, delay, jitter performance and metrics (for example cost) associated with resources in the network. The network topology information may include node and link identity as well as node/link connectivity. The SDN controller may then request computation of a Datapath by a Path Computation Element (PCE). The PCE calculates an optimal path based on source and destination node information and performance requirements received from the SDN controller, and on resource attribute and connectivity information received from the TED.

Data transported over an SDN may have varying levels of sensitivity. For example, certain data relating to financial or business transactions, to proprietary business information or technology, or to national or government interests may be considered to be particularly sensitive, and it may be desirable to place restrictions on how such data may be processed, transported or stored. In addition, certain sensitive data or processing practices may be subject to particular restrictions imposed by national laws of different nation states. Respecting such restrictions in the processing and transport of sensitive and other data remains an ongoing challenge.

SUMMARY

It is an aim of the present disclosure to provide a method, apparatus and computer readable medium which at least partially address one or more of the challenges discussed above.

According to a first aspect of the present disclosure, there is provided a method in a Software Defined Network (SDN), the SDN comprising a plurality of resources including Network Elements (NEs) and network links connecting the NEs. The method comprises receiving a user generated request to provision an SDN Datapath in the SDN, the request comprising performance metrics for the SDN Datapath and a geographic constraint to be applied to resources used in provisioning the SDN Datapath. The method further comprises assembling a candidate set of resources to provision the SDN Datapath and initiating provision of the SDN Datapath in accordance with the received performance metrics using resources selected from the candidate set. Assembling a candidate set of resources to provision the SDN Datapath comprises obtaining a geographic location attribute of resources in the SDN, and populating the candidate set with those resources having a geographic location attribute satisfying the received geographic constraint.

Aspects of the present disclosure thus enable a geographic restriction to be imposed on the routing of certain data, which may for example be sensitive data being exchanged between secured domains within a network. Conformity with a geographic restriction for the routing of data may be advantageous for example in applications in which territorial restrictions may be need to be imposed in line with national regulations.

According to examples of the present disclosure, an SDN Datapath may comprise a logical network device which exposes visibility and uncontended control over its advertised forwarding and data processing capabilities. The logical representation may encompass all or a subset of underlying physical substrate resources. An SDN Datapath may comprise a Control to Data Plane Interface (CDPI) agent, a set of one or more traffic forwarding engines and zero or more traffic processing functions. These engines and functions may include simple forwarding between the datapath's external interfaces or internal traffic processing or termination functions. One or more SDN Datapaths may be contained in a single (physical) network element which may be an integrated physical combination of communications resources, managed as a unit. An SDN Datapath may also be defined across multiple physical network elements. The logical definition of an SDN Datapath neither prescribes nor precludes implementation details such as the logical to physical mapping, management of shared physical resources, virtualization or slicing of the SDN Datapath, interoperability with non-SDN networking, nor the data processing functionality, which may include L4-7 functions.

According to examples of the disclosure, a geographic location attribute of a resource may comprise the physical location of the resource, or may comprise the physical location of the hardware on which the resource is hosted, in the case for example of an NE implemented via a Virtualised Network Function (VNF). The physical location may be expressed in some examples as coordinates or may be expressed with reference to defined territories, including regional or national territories. In the case of network links, the physical location attribute may simply indicate that the physical location of the network link is or is not the same as that of the NEs which it connects, or the physical location attribute may comprise a list of territories traversed by the link, or may comprise a set of geographic coordinates indicating the precise physical locations traversed by the link.

According to examples of the disclosure, the method may be conducted in a Path Computation Element (PCE), which may be a component of an SDN controller for the SDN, or may comprise an external application invoked by an SDN controller.

According to examples of the disclosure, provision of the SDN Datapath in accordance with the received performance metrics may be accomplished using a cost based algorithm, and populating the candidate set with those resources having a geographic location attribute satisfying the received geographic constraint may comprise applying an infinite cost to those resources having a geographic location attribute which does not satisfy the received geographic constraint.

According to examples of the disclosure, at least one of the NEs of the SDN network may be implemented via a Virtualised Network Function (VNF), and the geographic attribute of the NE implemented via a VNF may comprise an indication of the physical location of hardware provisioning the VNF. The hardware provisioning the VNF may comprise the Network Functions Virtualisation Infrastructure (NFVI) of a Data Centre in which the VNF is instantiated. The physical location of the hardware may therefore comprise the physical location of the relevant Data Centre. The hardware may comprise either or both of processing and/or storage hardware used in provisioning the VNF.

According to examples of the disclosure, the geographic location attribute of resources in the SDN may be obtained from an SDN controller of the SDN network. The geographic location attribute may for example be stored in a Master Resource Database (MRDB) or Traffic Engineering Database (TED) of the SDN controller.

According to examples of the disclosure, the request may further comprise a level of confidentiality to be applied to the SDN Datapath, and assembling a candidate set of resources to provision the SDN Datapath may further comprise obtaining a level of confidentiality attribute of resources in the SDN, and populating the candidate set with those resources having a geographic location attribute satisfying the received geographic constraint and a level of confidentiality attribute in accordance with the level of confidentiality to be applied to the SDN Datapath.

According to examples of the disclosure, the level of confidentiality attribute of resources in the SDN may be obtained from an SDN controller of the SDN network.

According to examples of the disclosure, the method may further comprise causing the level of confidentiality to be applied to the SDN Datapath to be stored in an SDN controller of the SDN network.

According to examples of the disclosure, users of the SDN may be associated with at least one level of confidentiality, and the method may further comprise, on receipt of the user generated request to provision an SDN Datapath in the SDN, comparing the level of confidentiality to be applied to the SDN Datapath with the or each level of confidentiality associated with the user generating the request. The method may further comprise, if the level of confidentiality to be applied to the SDN Datapath corresponds to at least one of the levels of confidentiality associated with the user generating the request, proceeding to assemble a candidate set of resources to provision the SDN Datapath. The method may further comprise, if the level of confidentiality to be applied to the SDN Datapath does not correspond to a level of confidentiality associated with the user generating the request, performing either one of rejecting the request or ignoring the request. Rejecting the request may for example comprise sending a rejection message to the user generating the request.

According to examples of the disclosure, the level of confidentiality to be applied to the SDN Datapath may be found to correspond to at least one of the levels of confidentiality associated with the user generating the request if at least one of the levels of confidentiality associated with the user generating the request confers at least the same or equivalent access and/or visibility privileges as the level of confidentiality to be applied to the SDN Datapath. In some examples, this may be because the level of confidentiality to be applied to the SDN Datapath is the same as at least one of the levels of confidentiality associated with the user generating the request. In other examples, this may be because the user generating the request is associated with a higher level of confidentiality than that to be applied to the SDN Datapath, and the higher level of confidentiality is considered to encompass all lower levels of confidentiality within its scope. The level of confidentiality to be applied to the SDN Datapath may be found not to correspond to any of the levels of confidentiality associated with the user generating the request if none of the levels of confidentiality associated with the user generating the request confers access and/or visibility privileges that are at least the same as or equivalent to those conferred by the level of confidentiality to be applied to the SDN Datapath. This may be the case for example if the level of confidentiality to be applied to the SDN Datapath is higher than all levels of confidentiality associated with the user generating the request.

According to examples of the disclosure, users may be prohibited from requesting an SDN Datapath if they do not have the appropriate level of confidentiality. For example, only users having an appropriate level of confidentiality may have visibility of secured SDN resources such as NEs and network links.

According to examples of the disclosure, initiating provision of the SDN Datapath in accordance with the received performance metrics using resources selected from the candidate set may comprise updating routing table entries for the resources, and the method may further comprise applying the level of confidentiality to be applied to the SDN Datapath to the updated routing table entries.

According to examples of the disclosure, applying the level of confidentiality to be applied to the SDN Datapath to the updated routing table entries may comprise applying the level of confidentiality on a row by row basis or may comprise placing all updated entries into a single table to which the level of confidentiality is applied.

According to examples of the disclosure, users of the SDN may be associated with at least one level of confidentiality, and applying the level of confidentiality to be applied to the SDN Datapath to the updated routing table entries may comprise allowing access to the updated routing table entries to only those users having an associated level of confidentiality that corresponds to the level of confidentiality to be applied to the SDN Datapath.

According to examples of the disclosure, users of the SDN may be associated with at least one level of confidentiality, and applying the level of confidentiality to be applied to the SDN Datapath to the updated routing table entries may comprise allowing visibility of the updated routing table entries to only those users having an associated level of confidentiality that corresponds to the level of confidentiality to be applied to the SDN Datapath.

According to examples of the disclosure, the method may further comprise establishing a modification requirement for the requested SDN Datapath and modifying the SDN Datapath. Modifying the SDN Datapath may comprise: if the modification requirement does not change the geographic constraint applied to the SDN Datapath, initiating provision of the SDN Datapath in accordance with the modification requirement using resources selected from the candidate set, and if the modification requirement changes the geographic constraint applied to the SDN Datapath, assembling a new candidate set of resources to provision the SDN Datapath in accordance with the changed geographic constraint and initiating provision of the SDN Datapath in accordance with the modification requirement using resources selected from the new candidate set.

According to examples of the disclosure, establishing a modification requirement for the SDN Datapath may comprise establishing a change in network conditions or network resource availability, or may comprise receiving a modification request for the SDN Datapath.

According to examples of the disclosure, users of the SDN may be associated with at least one level of confidentiality and establishing a modification requirement for the requested SDN Datapath may comprise receiving a modification request for the SDN Datapath from a user. The method may further comprise comparing the level of confidentiality applied to the SDN Datapath with a level of confidentiality associated with the user requesting modification of the SDN Datapath and, if the level of confidentiality applied to the SDN Datapath corresponds to at least one of the levels of confidentiality associated with the user requesting modification of the SDN Datapath, proceeding to modify the SDN Datapath. If the level of confidentiality to be applied to the SDN Datapath does not correspond to a level of confidentiality associated with the user requesting modification of the SDN Datapath, the method may further comprise performing either one of rejecting the request for modification or ignoring the request for modification. Rejecting the request for modification may for example comprise sending a rejection message to the user requesting modification.

According to examples of the disclosure, users having a level of confidentiality that does not correspond to that applied to the SDN Datapath may be unable to request modification of the SDN Datapath, for example if applying the requested level of confidentiality to the SDN Datapath comprises limiting access to and/or visibility of the routing table entries, NEs and links used to provision the SDN Datapath.

According to another aspect of the present invention, there is provided a method for configuring a Secure Domain (SD) in a Software Defined Network (SDN), the SDN comprising a plurality of resources including Network Elements, NEs, and network links connecting the NEs. The method comprises obtaining a geographic location attribute for a resource, comparing the geographic location attribute to entry requirements for the SD, and allocating the resource to the SD if the geographic location attribute satisfies the entry requirements.

According to examples of the disclosure, the geographic location attribute may comprise the physical location of the resource, or may comprise the physical location of the hardware on which the resource is hosted, in the case for example of an NE implemented via a Virtualised Network Function (VNF). The physical location may be expressed in some examples as coordinates or may be expressed with reference to defined territories, including regional or national territories. In the case of network links, the physical location attribute may simply indicate that the physical location of the network link is or is not the same as that of the NEs which it connects, or the physical location attribute may comprise a list of territories traversed by the link, or may comprise a set of geographic coordinates indicating the precise physical locations traversed by the link.

According to examples of the disclosure, at least one of the NEs of the SDN network may be implemented via a Virtualised Network Function (VNF) and the geographic attribute of the NE implemented via a VNF may comprise an indication of the physical location of hardware provisioning the VNF. The hardware provisioning the VNF may comprise the Network Functions Virtualisation Infrastructure (NFVI) of a Data Centre in which the VNF is instantiated. The physical location of the hardware may therefore comprise the physical location of the relevant Data Centre. The hardware may comprise either or both of processing and storage hardware used in provisioning the VNF.

According to examples of the disclosure, the method may further comprise obtaining a level of confidentiality attribute for the resource, comparing the level of confidentiality attribute to entry requirements for the SD, and allocating the resource to the SD if the geographic location attribute and the level of confidentiality attribute satisfy the entry requirements.

According to examples of the disclosure, the level of confidentiality attribute of a resource may be associated with at least one other attribute of the resource.

According to examples of the disclosure, the level of confidentiality attribute of the resource may be associated with the geographic location attribute of the resource.

According to further examples of the disclosure, the level of confidentiality attribute of the resource may be associated with all attributes of the resource, that is with the resource as a whole, or with just a specific one or more attributes such as the geographic location attribute. In this manner, the degree of protection afforded by the level of confidentiality, and consequent restrictions on access to and visibility of the resource, may be tailored to particular network requirements.

According to examples of the disclosure, users of the SDN may be associated with at least one level of confidentiality, and the geographic location attribute and level of confidentiality attribute of a resource may be allocated to the resource by a user. According to such examples, obtaining the geographic location attribute and level of confidentiality attribute for the resource may further comprise comparing the level of confidentiality attribute of the resource to the or each level of confidentiality associated with the user, and if the level of confidentiality attribute of the resource corresponds to at least one of the levels of confidentiality associated with the user, proceeding to compare the geographic location attribute and level of confidentiality attribute of the resource to entry requirements for the SD. If the level of confidentiality attribute of the resource does not correspond to a level of confidentiality associated with the user generating the request, the method may further comprise performing either one of rejecting the resource for the SD or ignoring the resource. Rejecting the resource for the SD may for example comprise sending a rejection message to the user who allocated the level of confidentiality attribute to the resource.

According to examples of the disclosure, the method may further comprise, if the resource is allocated to the SD, allowing access to the resource only to those users having an associated level of confidentiality that corresponds to the level of confidentiality attribute of the resource.

According to examples of the disclosure, allowing access to the NE may comprise authorising one or more of a set of operations to be conducted by the user on the NE, the set of operations including modification of NE attributes and routing table data.

According to examples of the disclosure, the method may further comprise, if the resource is allocated to the SD, allowing visibility of the resource only to those users having an associated level of confidentiality that corresponds to the level of confidentiality attribute of the resource.

According to examples of the disclosure, access and visibility restrictions may be applied to the resource as a whole or only to the or each attribute of the resource with which the level of confidentiality attribute of the resource is associated. For example if the level of confidentiality attribute is associated only with the geographic location attribute of the resource, then the access and/or visibility restrictions may apply only to the geographic location attribute of the resource, rather than to the entire resource.

According to examples of the disclosure, the method may further comprise determining whether an assigned role of the user is compatible with configuring a resource for the SD and, if the assigned role of the user is compatible with configuring a resource for the SD, proceeding to compare the level of confidentiality attribute of the resource to the or each level of confidentiality associated with the user. If the assigned role of the user is not compatible with configuring a resource for the SD, the method may further comprise performing either one of rejecting the resource for the SD or ignoring the resource. Rejecting the resource for the SD may for example comprise sending a rejection message to the user who allocated the level of confidentiality attribute to the resource.

According to examples of the disclosure, the assigned role of the user may be comprised within a hierarchy of roles including user and administrator roles.

According to examples of the disclosure, separation of duty may be applied to the hierarchy of user and administrator roles.

According to examples of the disclosure, the method may further comprise populating the geographic location attribute of the resource into a resource database of a controller of the SDN.

According to examples of the disclosure, the method may further comprise populating the level of confidentiality attribute of the resource into a resource database of a controller of the SDN.

According to examples of the disclosure, populating the geographic and confidentiality information into the SDN controller database may ensure it is available to a path calculation function hosted within or externally to the SDN controller.

According to another aspect of the present invention, there is provided a computer program comprising instructions which, when executed on at least one processor, cause the at least one processor to carry out a method according to any one of the preceding aspects of the present disclosure.

According to another aspect of the present invention, there is provided a carrier containing a computer program according to the preceding aspect of the present invention, wherein the carrier comprises one of an electronic signal, optical signal, radio signal or computer readable storage medium.

Examples of computer readable storage media may include electronic memory such as RAM, ROM, Flash memory, magnetic tape, CD-ROM, DVD and Blueray disc.

According to another aspect of the present invention, there is provided a computer program product comprising non transitory computer readable media having stored thereon a computer program according to a preceding aspect of the present invention.

Non transitory computer readable storage media comprises any computer readable storage medium other than a transitory signal. Examples of non transitory computer readable storage media may include electronic memory such as RAM, ROM, Flash memory, magnetic tape, CD-ROM, DVD and Blueray disc.

According to another aspect of the present invention, there is provided apparatus in a Software Defined Network (SDN), the SDN comprising a plurality of resources including Network Elements (NEs) and network links connecting the NEs. The apparatus comprises a processor and a memory, the memory containing instructions executable by the processor such that the apparatus is operative to receive a user generated request to provision an SDN Datapath in the SDN, the request comprising performance metrics for the SDN Datapath and a geographic constraint to be applied to resources used in provisioning the SDN Datapath. The apparatus is further operative to assemble a candidate set of resources to provision the SDN Datapath and initiate provision of the SDN Datapath in accordance with the received performance metrics using resources selected from the candidate set. Assembling a candidate set of resources to provision the SDN Datapath comprises obtaining a geographic location attribute of resources in the SDN and populating the candidate set with those resources having a geographic location attribute satisfying the received geographic constraint.

According to examples of the disclosure, the request may further comprise a level of confidentiality to be applied to the SDN Datapath, and the apparatus may be further operative to assemble a candidate set of resources to provision the SDN Datapath by obtaining a level of confidentiality attribute of resources in the SDN, and populating the candidate set with those resources having a geographic location attribute satisfying the received geographic constraint and a level of confidentiality attribute in accordance with the level of confidentiality to be applied to the SDN Datapath.

According to examples of the disclosure, users of the SDN may be associated with at least one level of confidentiality, and the apparatus may be further operative to, on receipt of the user generated request to provision an SDN Datapath in the SDN, compare the level of confidentiality to be applied to the SDN Datapath with the or each level of confidentiality associated with the user generating the request, and if the level of confidentiality to be applied to the SDN Datapath corresponds to at least one of the levels of confidentiality associated with the user generating the request, proceed to assemble a candidate set of resources to provision the SDN Datapath. If the level of confidentiality to be applied to the SDN Datapath does not correspond to a level of confidentiality associated with the user generating the request, the apparatus may be further operative to perform either one of rejecting the request or ignoring the request. Rejecting the request may for example comprise sending a rejection message to the user generating the request.

According to examples of the disclosure, the apparatus may comprise a Path Computation Element (PCE). According to examples of the disclosure, the apparatus may comprise a physical apparatus hosting a PCE as a VNF.

According to another aspect of the present disclosure, there is provided apparatus for configuring a Secure Domain (SD) in a Software Defined Network (SDN), the SDN comprising a plurality of resources including Network Elements (NEs) and network links connecting the NEs. The apparatus comprises a processor and a memory, the memory containing instructions executable by the processor such that the apparatus is operative to obtain a geographic location attribute for a resource, compare the geographic location attribute to entry requirements for the SD, and allocate the resource to the SD if the geographic location attribute satisfies the entry requirements.

According to examples of the disclosure, the apparatus may be further operative to obtain a level of confidentiality attribute for the resource, compare the level of confidentiality attribute to entry requirements for the SD, and allocate the resource to the SD if the geographic location attribute and the level of confidentiality attributes satisfy the entry requirements.

According to examples of the disclosure, users of the SDN may be associated with at least one level of confidentiality, and the geographic location attribute and level of confidentiality attribute may be allocated to the resource by a user. The apparatus may be further operative to obtain the geographic location attribute and level of confidentiality attribute for the resource by comparing the level of confidentiality attribute of the resource to the or each level of confidentiality associated with the user, and if the level of confidentiality attribute of the resource corresponds to at least one of the levels of confidentiality associated with the user, proceeding to compare the geographic location attribute and level of confidentiality attribute of the resource to entry requirements for the SD. If the level of confidentiality attribute of the resource does not correspond to a level of confidentiality associated with the user generating the request, the apparatus may be further operative to perform either one of rejecting the resource for the SD or ignoring the resource. Rejecting the resource for the SD may for example comprise sending a rejection message to the user who allocated the level of confidentiality attribute to the resource.

According to another aspect of the present disclosure, there is provided apparatus in a Software defined Network (SDN), the SDN comprising a plurality of resources including Network Elements (NEs) and network links connecting the NEs. The apparatus comprises a receiving unit for receiving a user generated request to provision an SDN Datapath in the SDN, the request comprising performance metrics for the SDN Datapath and a geographic constraint to be applied to resources used in provisioning the SDN Datapath. The apparatus further comprises a candidate unit for assembling a candidate set of resources to provision the SDN Datapath, and a provisioning unit for initiating provision of the SDN Datapath in accordance with the received performance metrics using resources selected from the candidate set. The candidate unit is for assembling a candidate set of NEs to provision the SDN Datapath by obtaining a geographic location attribute of resources in the SDN and populating the candidate set with those resources having a geographic location attribute satisfying the received geographic constraint.

According to another aspect of the present disclosure, there is provided apparatus for configuring a Secure Domain in a Software Defined Network (SDN), the SDN comprising a plurality of resources including network Elements (NEs) and network links connecting the NEs. The apparatus comprises an obtaining unit for obtaining a geographic location attribute for a resource, a comparing unit for comparing the geographic location attribute to entry requirements for the SD, and an allocating unit for allocating the resource to the SD if the geographic location attribute satisfies the entry requirements.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
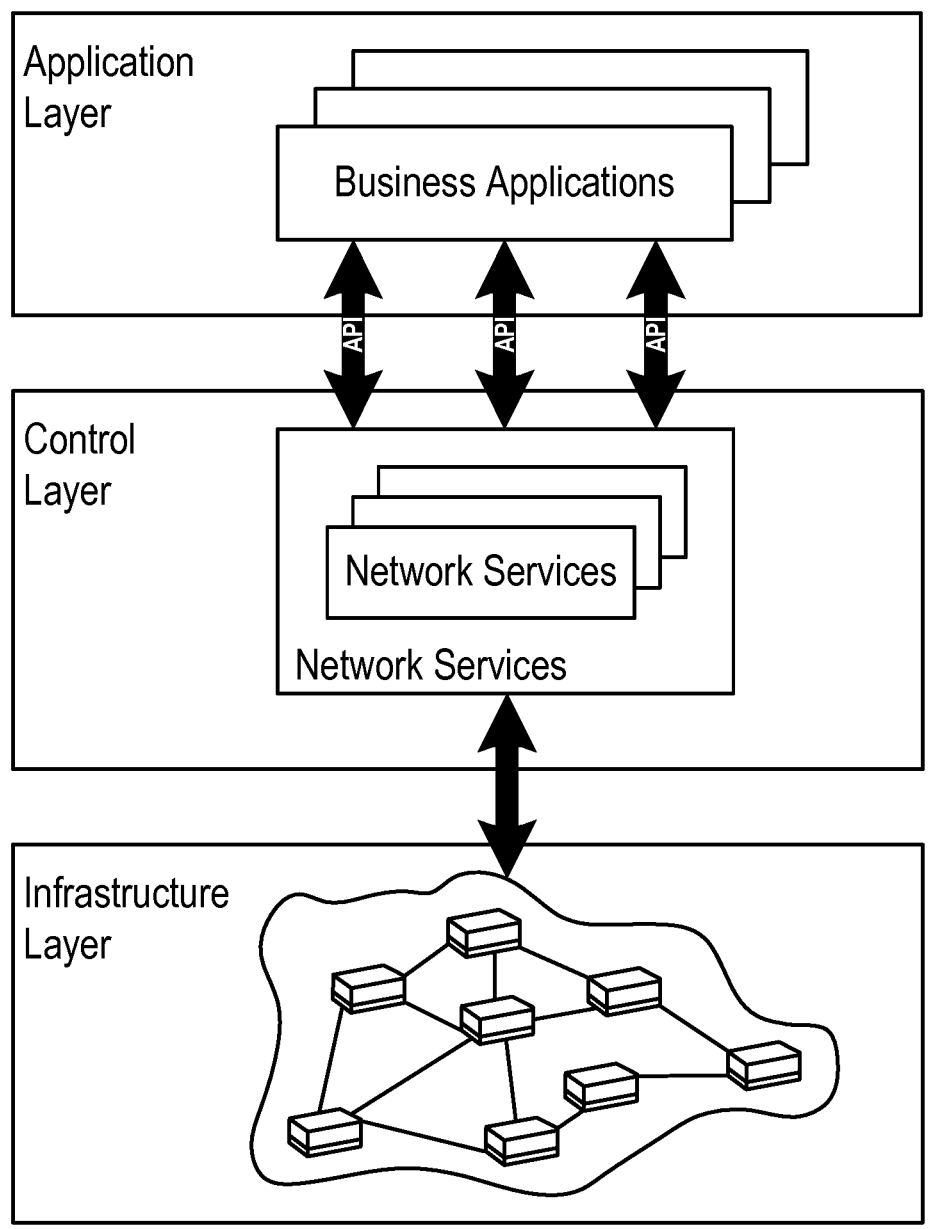
FIG. 1 illustrates an example SDN architecture.
Figure 2:
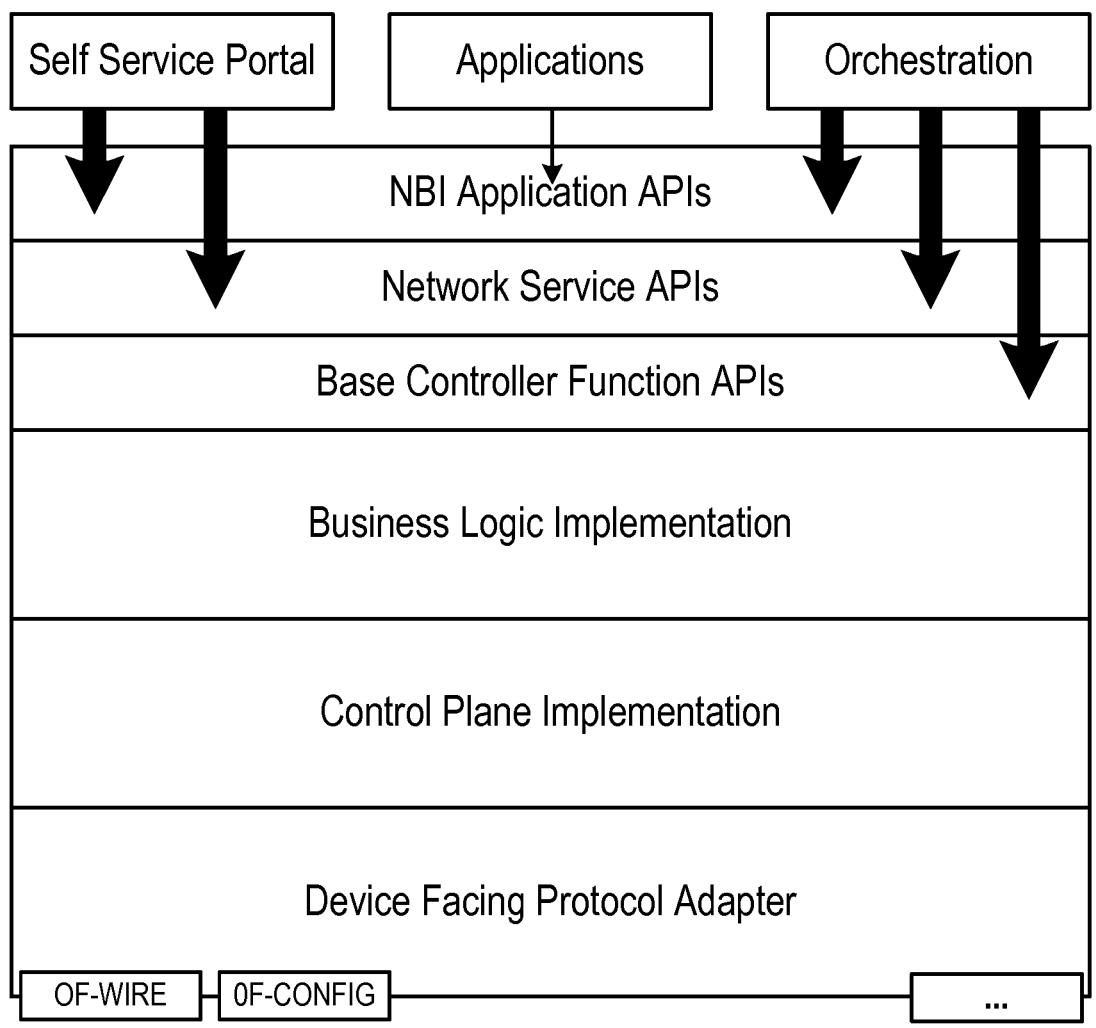
FIG. 2 illustrates APIs for SDN.
Figure 3:
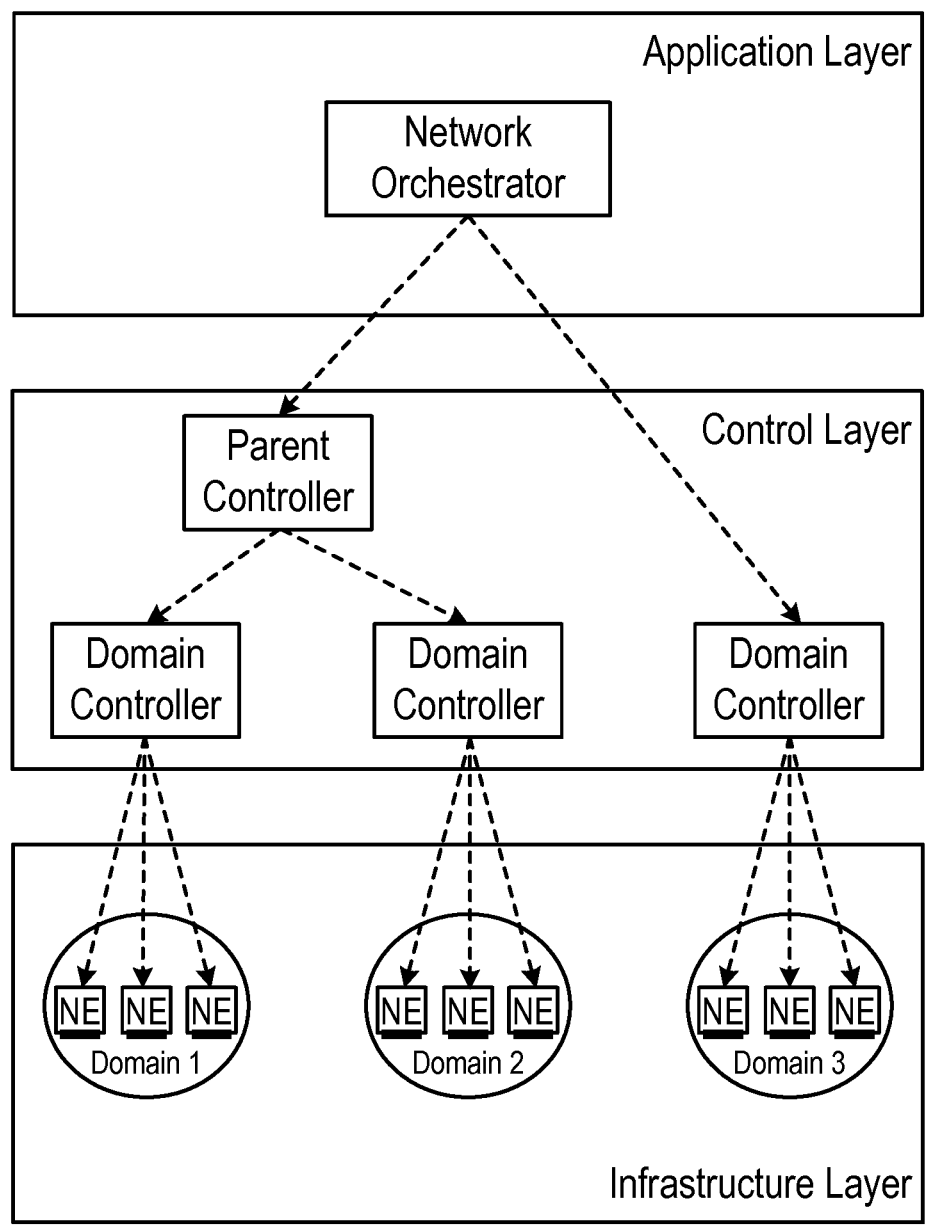
FIG. 3 illustrates another example SDN architecture

Examples of the present disclosure provide methods according to which a geographic constraint may be imposed on resources used to provision an SDN Datapath in a Software Defined Network. Respecting such a geographic constraint may provide a mechanism for ensuring that certain data either remains within specific geographic boundaries, or is prevented from either transiting through or being processed or stored in certain excluded geographic regions or territories. In examples of the disclosure, a level of confidentiality constraint may also be imposed on resources used to provision an SDN Datapath. Such a constraint may be used to ensure that only certain resources considered to have adequate security may be used to provision an SDN Datapath which is to be used to carry particular data, for example sensitive data. The level of confidentiality constraint may also be used to ensure that only certain network users may be able to view, access, request and/or modify such an SDN Datapath or the resources used to provision the SDN Datapath.

A Secure Domain (SD) is a network domain in which are grouped virtual and physical entities or objects with different levels of sensitivity. PCT/EP2016/062068 discloses a method for configuring an SD in a Network Functions Virtualisation Infrastructure (NFVI). According to PCT/EP2016/062068, an SD may be configured such that it is possible to control both user access to, and the physical location of, resources used to process sensitive data in the NFVI. Under certain circumstances it may be necessary or desirable to transfer data between different configured SDs in one or more NFVIs. It is also possible that Virtualised Network Functions running on an NFVI, and forming part of an SD configured according to PCT/EP2016/062068, may be hosted in physical Data Centres that are geographically separated, and a physical transport network may thus be used to transfer data within or between different configured SDs. The physical transport network may be used to transport data between different geographically separated Data Centres, or may be used for the internal transport of data within a single Data Centre. Many such physical transport networks are implemented using SDN technology, and examples of the present disclosure thus enable restrictions to be placed on the handling of data being transported within or between SDs configured within the Network Functions Virtualisation domain. These restrictions may include geographic restrictions on the physical location of resources used for the transport of data, and may also include level of confidentiality restrictions. Additionally, examples of the present disclosure enable the configuration of a Secure Domain within an SDN network. The SDN SD configured according to examples of the present disclosure may compliment an NFVI SD configured according to PCT/EP2016/062068, ensuring that appropriate restrictions may be placed on the processing, storage and transport of data at all levels from the Virtual Link level down to the Physical level.

Figure 4:
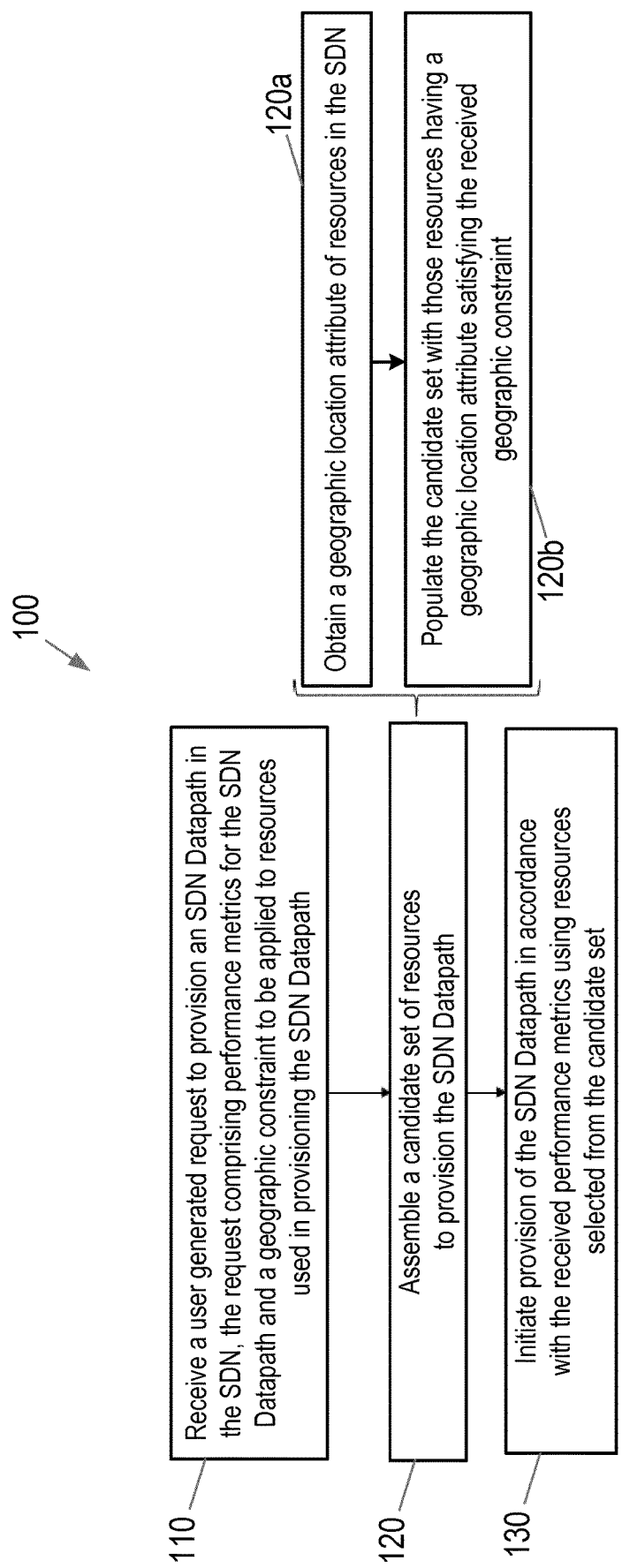
FIG. 4 is a flow chart illustrating process steps in a method in a Software Defined Network.

FIG. 4 is a flow chart illustrating process steps in a method 100 conducted in a Software Defined Network (SDN). The method may in some examples be conducted in an element having Traffic Engineering responsibility, such as a Path Computation Element (PCE). Referring to FIG. 4, in a first step 110, the method 100 comprises receiving a user generated request to provision an SDN Datapath in the SDN. The request comprises performance metrics for the SDN Datapath and a geographic constraint to be applied to resources used in provisioning the SDN Datapath. In step 120, the method comprises assembling a candidate set of resources to provision the SDN Datapath. The resources may for example comprise Network Elements (NEs) in the SDN as well as network links that interconnect the NEs. The step of assembling a candidate set of resource comprises, in a first sub-step 120a, obtaining a geographic location attribute of resources in the SDN, and, in a second sub-step 120b, populating the candidate set with those resources having a geographic location attribute satisfying the received geographic constraint. The method 100 then comprises, in step 130, initiating provision of the SDN Datapath in accordance with the received performance metrics using resources selected from the candidate set. The sub-step 120b of populating the candidate set with those resources having a geographic location attribute satisfying the received geographic constraint may be performed in a variety of different ways, including for example, in a cost based system, placing an infinite cost on resources having a geographic attribute that does not satisfy the constraint. The cost may be assigned only for the provisioning of the requested SDN Datapath. Additional options for the populating of the candidate set are discussed below with reference to FIG. 5.

The geographic location attribute of a network resource may be expressed in a variety of different ways, and may vary according to the nature of the resource. In one example, the geographic location attribute may be expressed as a national location, such as Germany, France or the USA, or a nationally or internationality defined territory or region including for example the European Union. In other examples, the geographic location attribute may be expressed as coordinates. In the case of network links, which interconnect different network elements, the geographic location attribute may, at a basic level indicate whether or not the network link has the same geographic location as the network elements which it connects, as network links may cross territorial borders even for example when both ends are located within the same territory. In other examples, the geographic location attribute of a network link may comprise a list of territories or national or international regions which the link traverses.

In still further examples, the geographic location attribute may include coordinate ranges for the precise physical location of the link across its entire length. The geographic location attribute of resources in the SDN may for example be stored in a TED or Master Resource Database (MRDB) of an SDN controller of the SDN. The geographic location attribute may thus form part of the resource topology definition stored in the TED or MRDB. The geographic location attribute is thus available to a PCE or other Traffic Engineering element to be taken into account when provisioning a requested SDN Datapath.

As discussed above, the resources used for provisioning the requested SDN Datapath may include both Network Elements and the network links interconnecting such Network Elements. In some examples, one or more Network Elements may be implemented by a Virtualised Network Function, for example when an SDN provisions an End-to-End network service. In such examples, the geographic location attribute of the Network Element may comprise the geographic location of the physical elements hosting the VNF. The physical elements hosting the VNF may comprise the Network Functions Virtualisation Infrastructure (NFVI) of a Data Centre in which the VNF is instantiated. The geographic location of the physical elements may therefore comprise the physical location of the relevant Data Centre.

The geographic constraint to be applied to resources used in provisioning the requested SDN datapath may be expressed in any appropriate manner, including a positive restriction indicating an allowed geographic location within which the resources must be located, or a negative restriction indicating certain prohibited or "blacklisted" geographic locations. The nature of the constraint may be determined by a particular application. For example, compliance with national laws concerning Lawful Interception or certain financial or business regulations may require a SDN Datapath to be provisioned with resources that are located within the nation state whose laws are to be respected. In other examples, in the case of the transfer of sensitive data which may be susceptible to intercept, the constraint may concern a list of blacklisted states in which the risk of intercept is considered to be unacceptably high, or where infrastructure security or data protection laws are judged to be insufficient.

In some examples, the step 120 of assembling a candidate set of resources and the step 130 of initiating provision of the requested SDN Datapath may be performed substantially simultaneously, with the filtering effect of the candidate set being applied on a continuous basis as part of the cost based or other process for provisioning the SDN Datapath in accordance with the requested performance metrics. In some examples, Interior Gateway Protocol (IGP) metrics may be modified such that the geographic location information for resources is included together with other standard metrics.

Figure 5A:
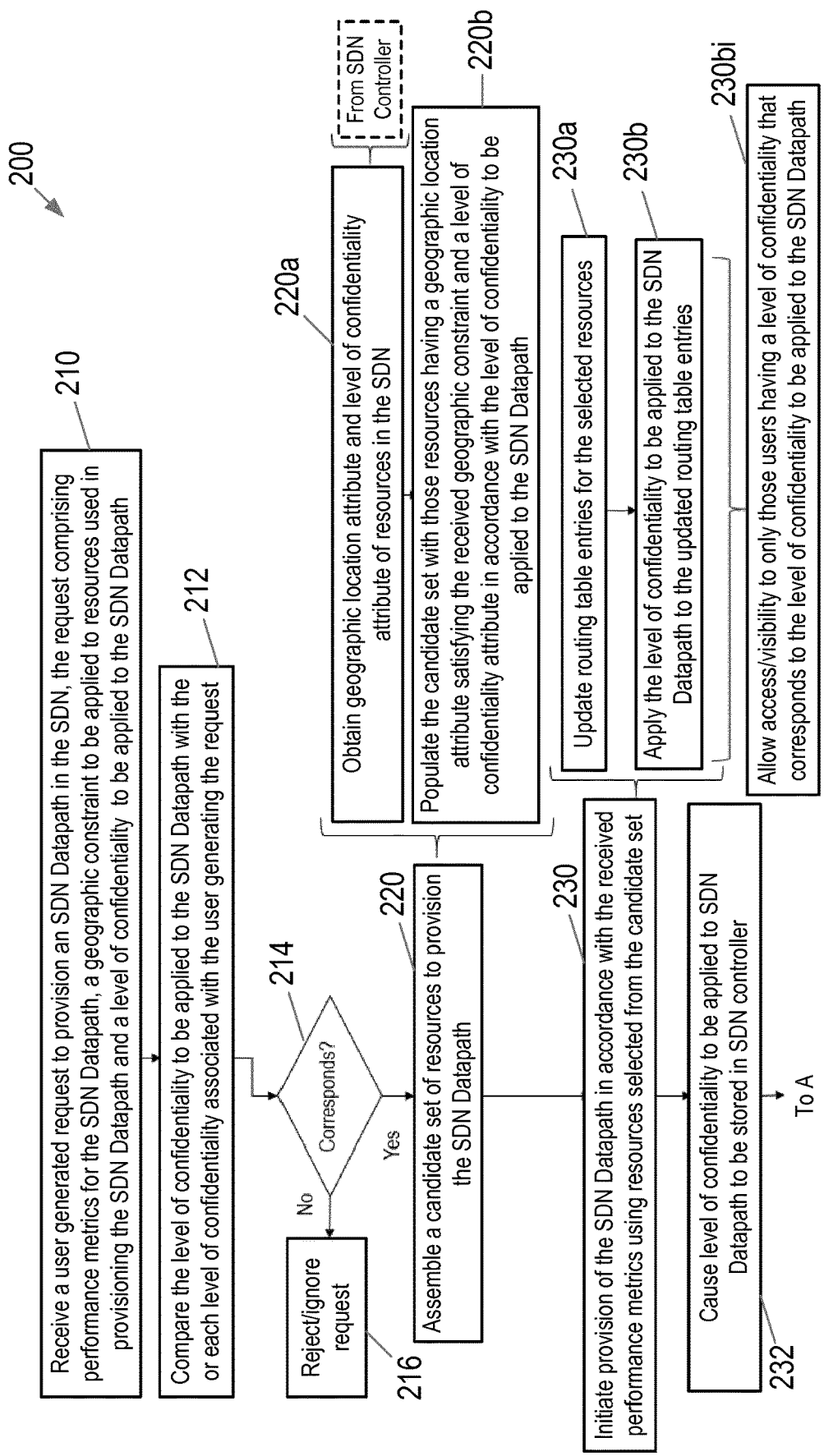
FIGS. 5a and 5b are a flow charts illustrating process steps in another example of method in a Software Defined Network.
Figure 5B:
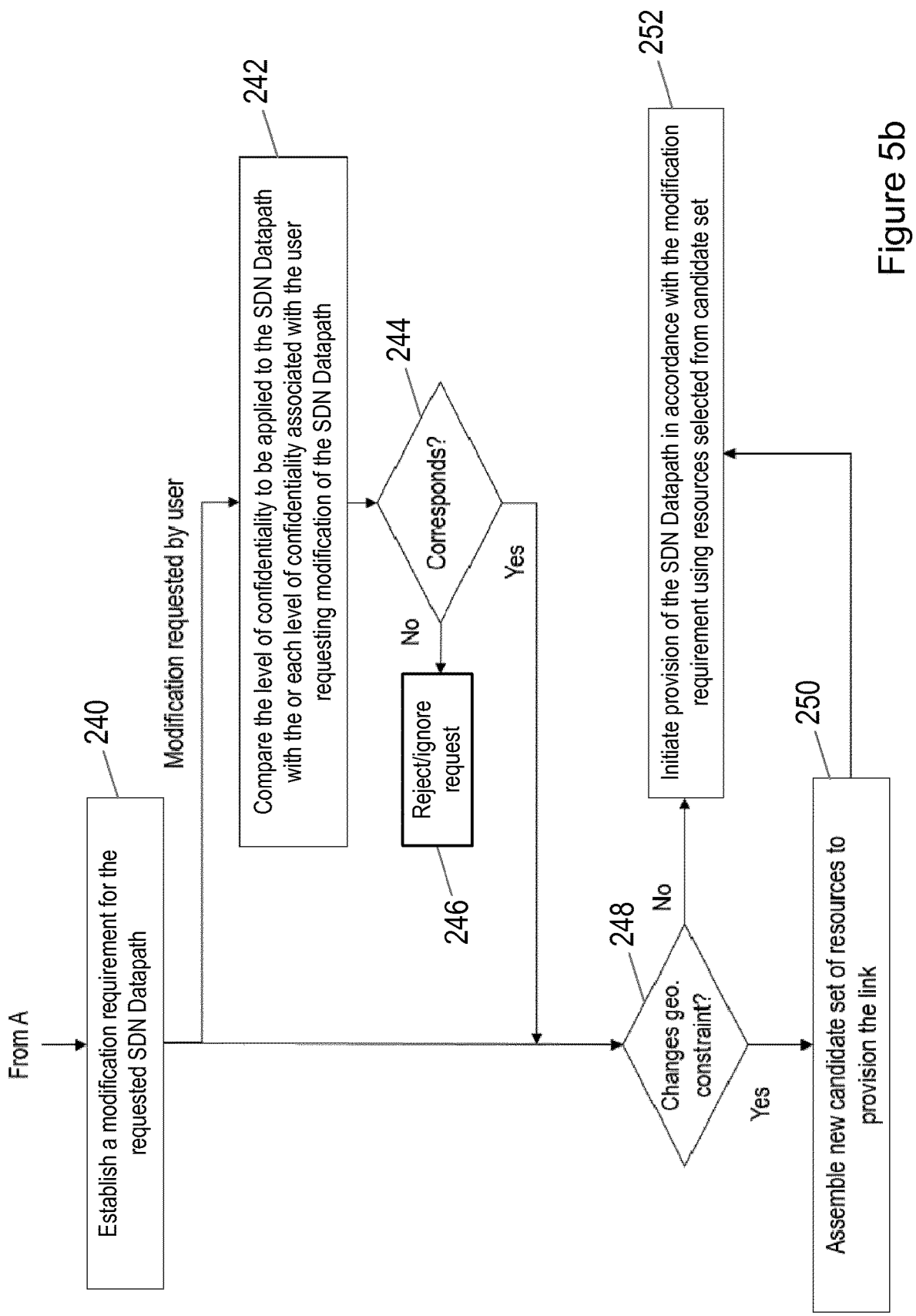

FIGS. 5a and 5b are flow charts illustrating another example of method 200 conducted in an SDN. The method 200 of FIGS. 5a and 5b is one example of how the steps of the method 100 of FIG. 4 may be implemented and supplemented to achieve the above discussed and additional functionality. As in the case of the method 100 of FIG. 4, the method 200 of FIG. 5 may be conducted in an element having Traffic Engineering responsibility, such as a Path Computation Element (PCE).

The method 200 of FIGS. 5a and 5b introduces the concept of a level of confidentiality within the SDN, which level of confidentiality may be applied as an attribute of network resources and may also be applied to individual users of the SDN. A level of confidentiality may be used to impose restrictions on access to and/or visibility of resources, such that only users having an appropriate level of confidentiality may be able to perform operations on, and/or have visibility of, protected network resources. Level of confidentiality may be expressed for example on a numeric scale of 1 to 5, or in any other suitable manner. Levels of confidentiality may include all lower levels, such that a level of confidentiality 3 is considered to encompass also levels of confidentiality 1 and 2. Alternatively, levels of confidentiality may be distinct, such that an individual user or resource may be assigned for example levels of confidentiality 1, 3 and 5, without being assigned level 2 or level 4. The set of all levels of confidentiality assigned to a user is referred to in the following discussion as the permission sphere of a user, thus individual users may have visibility of and/or access to all network resources having levels of confidentiality within their permission sphere.

When applied as an attribute of a network resource, the level of confidentiality may in some examples be applied to the entire resource, or may be applied only to a specific one or more other attributes of the resource, including for example the geographic location attribute. Thus in a first example, a level of confidentiality attribute for a network link may be applied to the entire link, such that restrictions concerning access and/or visibility apply to the entire link. In a second example, the level of confidentiality may apply only to the geographic location attribute, such that all users may have visibility of and/or access to the link but only those users having an appropriate level of confidentiality may have visibility of and/or access to the geographic location attribute of the link. In practical terms this means that the precise physical location of the link may be a protected information, with only authorised users being able to access this information. The level of confidentiality attribute of individual resources may be stored in a TED or MRDB of an SDN controller, together with the geographic location attribute as discussed above.

Referring to FIG. 5a, in a first step 210, the method 200 comprises receiving a user generated request to provision an SDN Datapath in the SDN, the request comprising performance metrics for the SDN Datapath, a geographic constraint to be applied to resources used in provisioning the SDN Datapath, and a level of confidentiality to be applied to the SDN Datapath. The method then comprises, in step 212, comparing the level of confidentiality to be applied to the SDN Datapath with the or each level of confidentiality associated with the user generating the request. If the level of confidentiality requested for the SDN Datapath is within the permission sphere of the requesting user (step 214—Yes), the method proceeds to step 220. If the level of confidentiality requested for the SDN Datapath is not within the permission sphere of the requesting user (step 214—No), the method proceeds to step 216 and either rejects or ignores the request Rejecting the request may comprise actively communicating the rejection to the user generating the request, for example via a message. Ignoring the request may comprise taking no further action in connection with the request. As discussed above, the level of confidentiality to be applied to the SDN Datapath may be found to correspond to at least one of the levels of confidentiality associated with the user generating the request if at least one of the levels of confidentiality associated with the user generating the request confers at least the same or equivalent access and/or visibility privileges as the level of confidentiality to be applied to the SDN Datapath. In some examples, this may be because the level of confidentiality to be applied to the SDN Datapath is the same as at least one of the levels of confidentiality associated with the user generating the request. In other examples, this may be because the user generating the request is associated with a higher level of confidentiality than that to be applied to the SDN Datapath, and the higher level of confidentiality is considered to encompass all lower levels of confidentiality within its scope. The level of confidentiality to be applied to the SDN Datapath may thus be encompassed within the permission sphere of the user generating the request. The level of confidentiality to be applied to the SDN Datapath may be found not to correspond to any of the levels of confidentiality associated with the user generating the request if none of the levels of confidentiality associated with the user generating the request confers access and/or visibility privileges that are at least the same as or equivalent to those conferred by the level of confidentiality to be applied to the SDN Datapath. This may be the case for example if the level of confidentiality to be applied to the SDN Datapath is higher than all levels of confidentiality associated with the user generating the request.

In some examples of the present disclosure, it may be that users are prohibited from even requesting an SDN Datapath with a level of confidentiality that is outside their own permission sphere owing to the access and visibility restrictions imposed by the level of confidentiality attribute. For example, if resources having a level of confidentiality outside of a given user's permission sphere are not visible to that user, that user will not be in a position to request provision of an SDN Datapath encompassing those resources. In such circumstances, the comparing steps 212 and 214 may be rendered unnecessary. However, it may be appropriate to include such comparing steps as an additional security check, and to account for configurations in which access and/or visibility restrictions are not applied to an entire resource but only to specific attributes of the resource.

Referring again to FIG. 5a, after the comparing steps 212 and 214, the method proceeds to assemble a candidate set of resources to provision the requested SDN Datapath in step 220. This assembling step comprises, in a first sub-step 220*a*, obtaining a geographic location attribute and a level of confidentiality attribute for resources in the SDN. These attributes may be obtained, together with cost and other performance data for the resources, from a TED or MRDB in an SDN controller. In a second sub-step 220*b*, the assembling step 220 comprises populating the candidate set with those resources having a geographic location attribute satisfying the received geographic constraint and a level of confidentiality attribute in accordance with the level of confidentiality to be applied to the SDN Datapath. In some examples, any resources which do not have an assigned geographic location attribute or a level of confidentiality attribute may be considered to be unsecured and thus excluded from the candidate set. In the case of a cost based system for SDN Datapath provision, an infinite cost may be associated to resources having attributes that do not meet the requirements of the SDN Datapath request, with the candidate set of resources comprising those resources having a non-infinite cost. In other examples, any appropriate filtering technique may be used to enable filtering on the basis of both geographic location attribute and level of confidentiality attribute, such that only those resources having geographic location attribute and level of confidentiality attribute satisfying the requirements of the requested SDN Datapath are available for consideration in the provisioning of the requested SDN Datapath.

Following assembling of the candidate set, the method comprises, at step 230, initiating provision of the requested SDN Datapath in accordance with the received performance metrics and using resources selected from the candidate set. By selecting only resources from the candidate set, the method implements a filtering such that the geographic and level of confidentiality constraints included with the request for the SDN Datapath are respected. In some examples, the steps of assembling a candidate set of resources and initiating provision of the requested SDN Datapath may be performed substantially simultaneously, with the filtering effect of the candidate set being applied on a continuous basis as part of the cost based or other process for provisioning the SDN Datapath in accordance with the requested performance metrics.

In some examples, the process of initiating provision of the requested SDN Datapath may comprise updating routing table entries for the selected resources, as illustrated in sub-step 230*a*. In such examples, the initiating provision step 230 may also comprise, in sub-step 230*b*, applying the level of confidentiality to be applied to the SDN Datapath to the updated routing table entries. This may comprise, as indicated in sub-step 230*bi*, allowing access and/or visibility of the routing table entries to only those users having a level of confidentiality that corresponds to the level of confidentiality to be applied to the SDN Datapath. OpenFlow is an example of a standard according to which routing tables define the routing behaviours of network elements and links. Level of confidentiality may be applied to routing table entries either on a row by row basis, protecting single table rows according to the level of confidentiality applied, such that only users with a sphere of permission that includes the applied level of confidentiality may be authorised to access and/or view the protected rows. Alternatively, a protected table may be created, in which all table entries are characterised by a certain level of confidentiality. Such table entries may only be viewed and/or accessed by users having an appropriate level of confidentiality within their permission sphere. Example actions that may be found in OpenFlow routing tables and which may be protected with levels of confidentiality include the following:

1. Forward packet to zero or more ports
2. Encapsulate and forward to controller
3. Send to normal processing pipeline
4. Modify fields Actions 1, 2 and 4 from the example list above may be particularly important to protect with an appropriate level of confidentiality, as they may be used to redirect or to tap communication flows.

Referring still to FIG. 5*a*, following the step 230 of initiating provision of the SDN Datapath, the method comprises, at step 232, causing the level of confidentiality to be applied to the SDN Datapath to be stored in the appropriate SDN controller.

The method steps illustrated in FIG. 5*a* illustrate how provision of an SDN Datapath may be initiated in accordance with an example of the present disclosure, enforcing restrictions on geographic location and level of confidentiality of resources used in provisioning a requested SDN Datapath. Such restrictions may also be enforced in the event of modification to the requested SDN Datapath, as illustrated in the steps of FIG. 5*b*.

Referring to FIG. 5*b*, the method 200 may comprise, in step 240, establishing a modification requirement for the requested SDN Datapath. A modification requirement may be established for a number of reasons, including for example a user originating request or changes in network conditions or resource availability. Addition of new links to the network, changes in network performance or traffic conditions, link failures etc. may all lead to the modification of Datapaths provisioned in the network. Such a modification requirement may concern the SDN Datapath itself, for example in the event of a link failure affecting the SDN Datapath, or may concern the geographic location or level of confidentiality restrictions imposed on the SDN Datapath. For example, a new state may be added to a blacklist of states to be avoided, or a change of circumstances in a particular territory may lead to that territory becoming acceptable for sensitive data transmission, thus increasing the number of network resources which may satisfy the modified geographic constraint.

In the event of a user originating modification request, the method 200 may comprise, at step 242, comparing the level of confidentiality applied to the SDN Datapath with the or each level of confidentiality associated with the user making the modification request. If the level of confidentiality of the SDN Datapath is not within the permission sphere of the requesting user (step 244—No), the method may comprise rejecting or ignoring the modification request at step 246. Rejecting the request may comprise actively communicating the rejection to the user generating the modification request, for example via a message. Ignoring the request may comprise taking no further action in connection with the modification request. If the level of confidentiality of the SDN Datapath is within the permission sphere of the requesting user (step 244—Yes), the method may proceed to step 248. As discussed above with respect to the initial provisioning of the SDN Datapath, if user visibility of the SDN Datapath is restricted using the level of confidentiality attribute, then it may not be possible for an unauthorised user to request modification of an SDN Datapath, as only authorised users have visibility of the SDN Datapath. However, in the event that visibility is not restricted according to the level of confidentiality of the SDN Datapath, the comparison steps 242 and 244 may ensure that only authorised users are able to modify a provisioned SDN Datapath.

In step 248, the method 200 checks whether the modification requirement imposes a change on the geographic constraint applied to the SDN Datapath, for example following the addition of an allowed or blacklisted territory. If the geographic constraint is changed (step 248—Yes), the method comprises assembling a new candidate set of resources to provision the SDN Datapath in accordance with the performance metrics for the link and the modified geographic constraint at step 250. This assembling step may be performed in substantially the same manner as described above for initial SDN Datapath provision. An additional check may be made as to whether or not the level of confidentiality of the SDN Datapath is changed by the modification request, which change may also prompt the assembly of a new candidate set Once the new candidate set of resources is assembled, or if changes to the candidate set are not required (step 248—No), the method then comprises, at step 252, initiating provision of the SDN Datapath in accordance with the modification requirement using resources selected from the candidate set, which may be the new candidate set if appropriate. As discussed above, the steps of assembling a candidate set and initiating provision of the SDN Datapath may be conducted substantially simultaneously, according to the manner in which the candidate set is assembled and SDN Datapath provision is initiated. The example method illustrated in FIG. 5*b* thus demonstrates how conformity with geographic and level of confidentiality constraints may be enforced with on the fly routing or path modification owing to changes in network topology, network conditions, requirements for the SDN Datapath etc.

Figure 6:
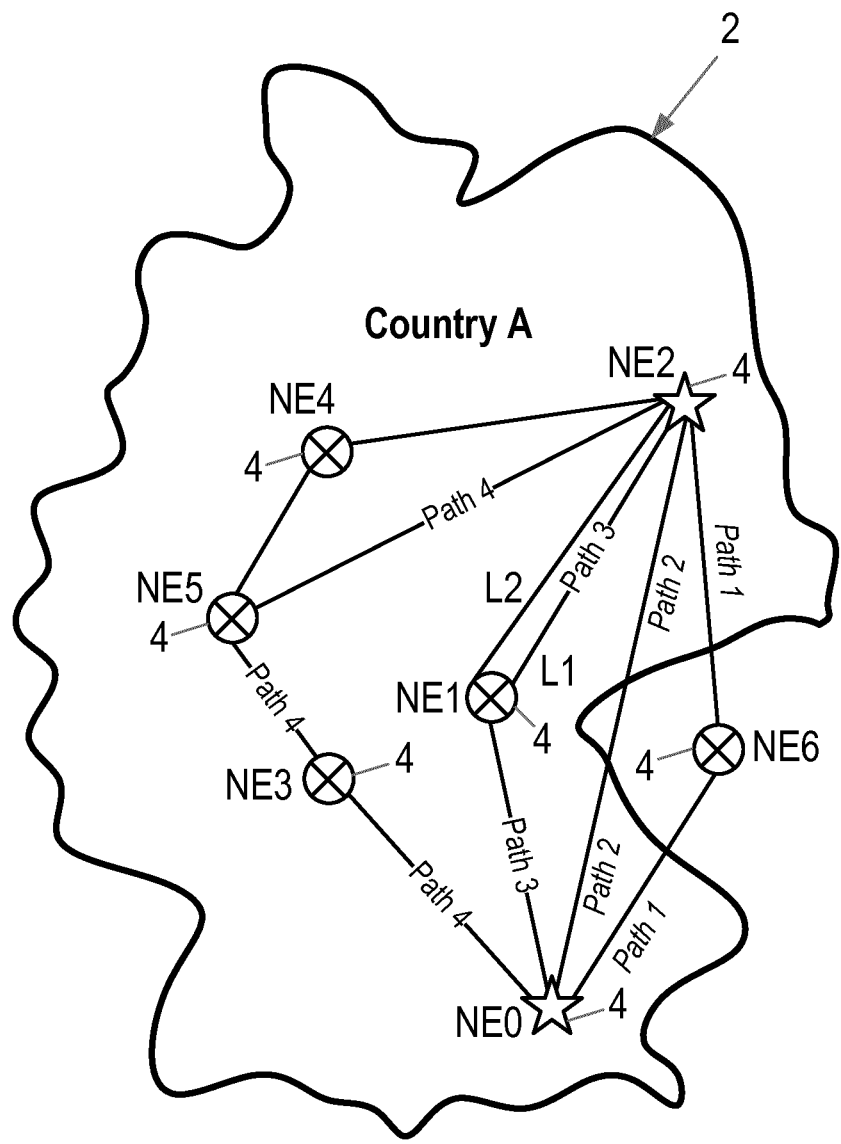
FIG. 6 is a map illustrating different resources which may be candidates for provisioning an SDN Datapath.

Example provision of SDN Datapaths which may result from application of the methods 100, 200 is illustrated in FIG. 6. FIG. 6 is a generic map of a nation, "Country A", having national borders 2. A plurality of NEs 4 are located within the borders of country A and a single NE 4 is located in a neighbouring country. A plurality of network links 6 interconnects the NEs 4. In an example scenario, a request is received for provisioning of an SDN Datapath from NE0 to NE2. The request includes a geographic constraint that the SDN Datapath should be provisioned with resources located in country A. The constraint may be included as a tag on the SDN Datapath request. Enforcing the tag ensures that data on the provisioned SDN Datapath will not cross the national borders of country A. This restriction may satisfy legal requirements, for example related to Lawful Intercept, or may be consistent with security or other concerns. FIG. 6 illustrates a range of possible paths between NE0 and NE2. A PCE operating in a conventional manner would consider only performance metrics in selecting the most appropriate path. Path 2 offers a single hop between NE0 and NE2 and may thus be a preferred option for a conventional PCE if the link satisfies other performance metrics. Paths 1 and/or 3 may be acceptable alternatives to path 2, for example if the link of path 2 is already oversubscribed. In accordance with examples of the present disclosure, in addition to considering standard performance metrics, a PCE additionally imposes conformity with the received geographic requirement, that is that the SDN Datapath should not cross national borders. Path 1 in FIG. 6 includes an NE which is located outside country A. This NE would not be populated into the candidate set as its location attribute would indicate it to be outside the borders of country A, and path 1 would not therefore be selected by a PCE operating according to examples of the present disclosure. Path 2 also includes a resource that crosses the borders of country A. Although the link of path 2 originates and terminates in country A, it traverses a neighbouring country, and so would also not be populated into the candidate set of resources for provisioning the requested SDN Datapath. Path 3, being entirely located within the borders of country A, would be preferred by a PCE operating according to examples of the present disclosure, and NE1 and the links NE0-NE1 and NE1-NE2 would thus be the preferred resources for provisioning the SDN Datapath, subject to performance metrics and any level of confidentiality constraints.

FIG. 6 also illustrates path options for the provision of resiliency. In the event that NE1 fails, the PCE operating in accordance with aspects of the present disclosure seeks an alternative path that still satisfies the geographic constraint of remaining within the borders of country A. The failure of NE1 is processed as an established modification requirement, as discussed above with respect to FIG. 5*b*. In this situation, path 4 is a suitable alternative, as it offers what is now the shortest route between NE0 and NE2 that respects the geographic constraint. The rerouting of the SDN Datapath from path 3 to path 4 changes the NEs that are traversed and also the physical links used for the data transport. In many practical scenarios, links between the NEs may be a logical partitioning of the underlying physical link or may be different fibres in the same physical link. Rerouting of the SDN Datapath may be performed without manual intervention, simply as part of a resilience mechanism assigned to the SDN Datapath. In an alternative example, resiliency may be provided within path 3 itself. FIG. 6 illustrates two physical links L1 and L2 between NE1 and NE2. These physical links may be separate physical links or may for example be different fibres in the same physical link, and may be used as backup for each other. In the event of failure of L1, path 3 is rerouted to use L2. A new logical link is created that uses part or all the capacity of the L2 physical link to provision path 3. The new logical link, or the entire L2 if is completely assigned to path 3, will be given the same level of confidentiality as the logical or physical link L1. In the event of multiple logical links defined on a single underlying physical link, the logical links may have differing levels of confidentiality, according to the level of confidentiality requested for the SDN datapath of which the logical links are a part. This, as in the previous example, is performed without manual intervention.

The provisioning of a requested SDN Datapath as discussed above with reference to FIGS. 4, 5 and 6 may operate independently of, or in combination with, Secure Domains (SDs) which may be defined within an SDN. As discussed above, a Secure Domain is a network domain in which are grouped entities or objects with different levels of sensitivity. Aspects of the present disclosure provide a method for configuring an SD in an SDN, according to which geographic location of entities in the SD may be controlled. An SD configured in this way in an SDN may complement SDs configured in an NFVI, and may be used to transport data to, from and between SDs in an NFVI.

Figure 7:
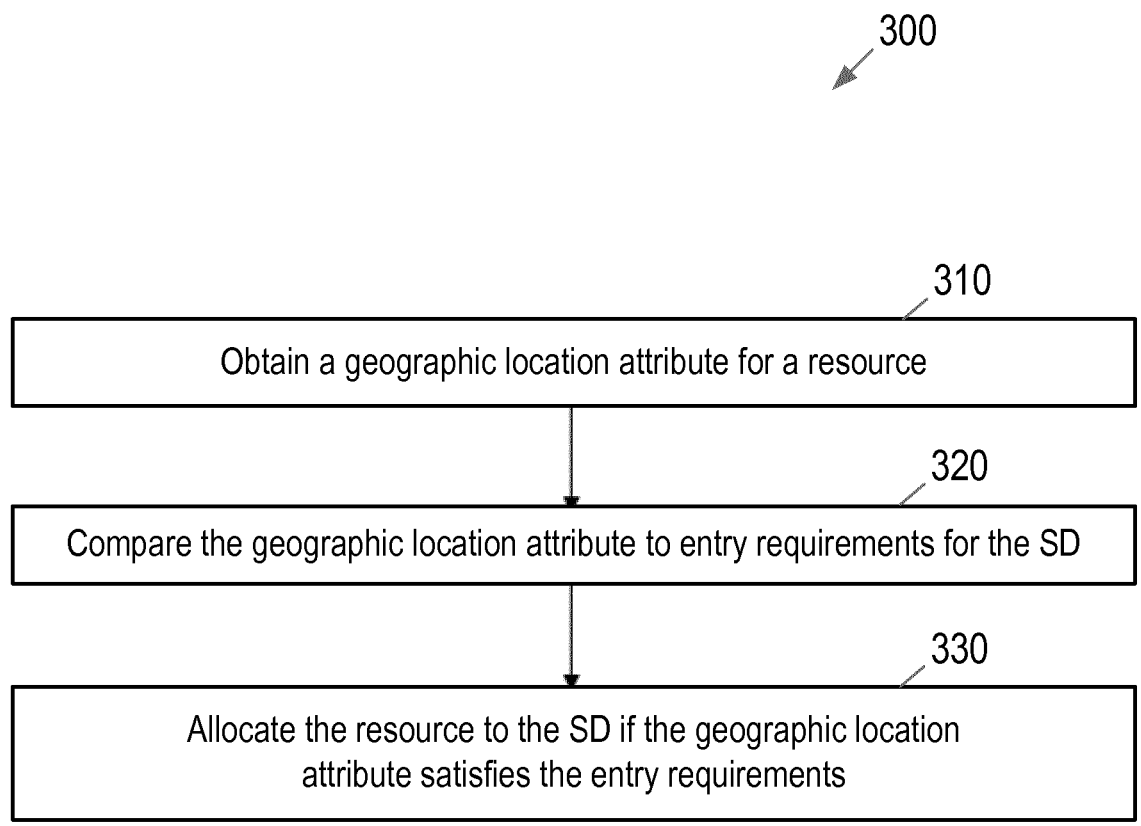
FIG. 7 is a flow chart illustrating process steps in a method for configuring a Secure Domain in a Software Defined Network.

FIG. 7 is a flow chart illustrating process steps in a method 300 for configuring an SD in a Software Defined Network. The method 300 may for example be conducted by an SDN controller of the network. Referring to FIG. 7, in a first step 310, the method comprises obtaining a geographic location attribute for a network resource, which may for example be a Network Element (NE) or a network link providing connectivity between NEs. The method then comprises, in step 320, comparing the geographic location attribute of the resource to entry requirements for the SD, and, in step 330, allocating the resource to the SD if the geographic location attribute satisfies the entry requirements.

The geographic location attribute of the network resource may be expressed in a variety of different ways, as discussed above with reference to FIG. 4. The geographic location attribute of the network resource may for example be stored in a TED or Master Resource Database (MRDB) of the SDN controller. The geographic location attribute may thus form part of the resource topology definition stored in the TED or MRDB. The entry requirements for the SD may also be expressed in a variety of different ways, including allowed or excluded national or international territories or regions, as discussed above with reference to the geographic constraint applied in method 100 of FIG. 4.

Figure 8:
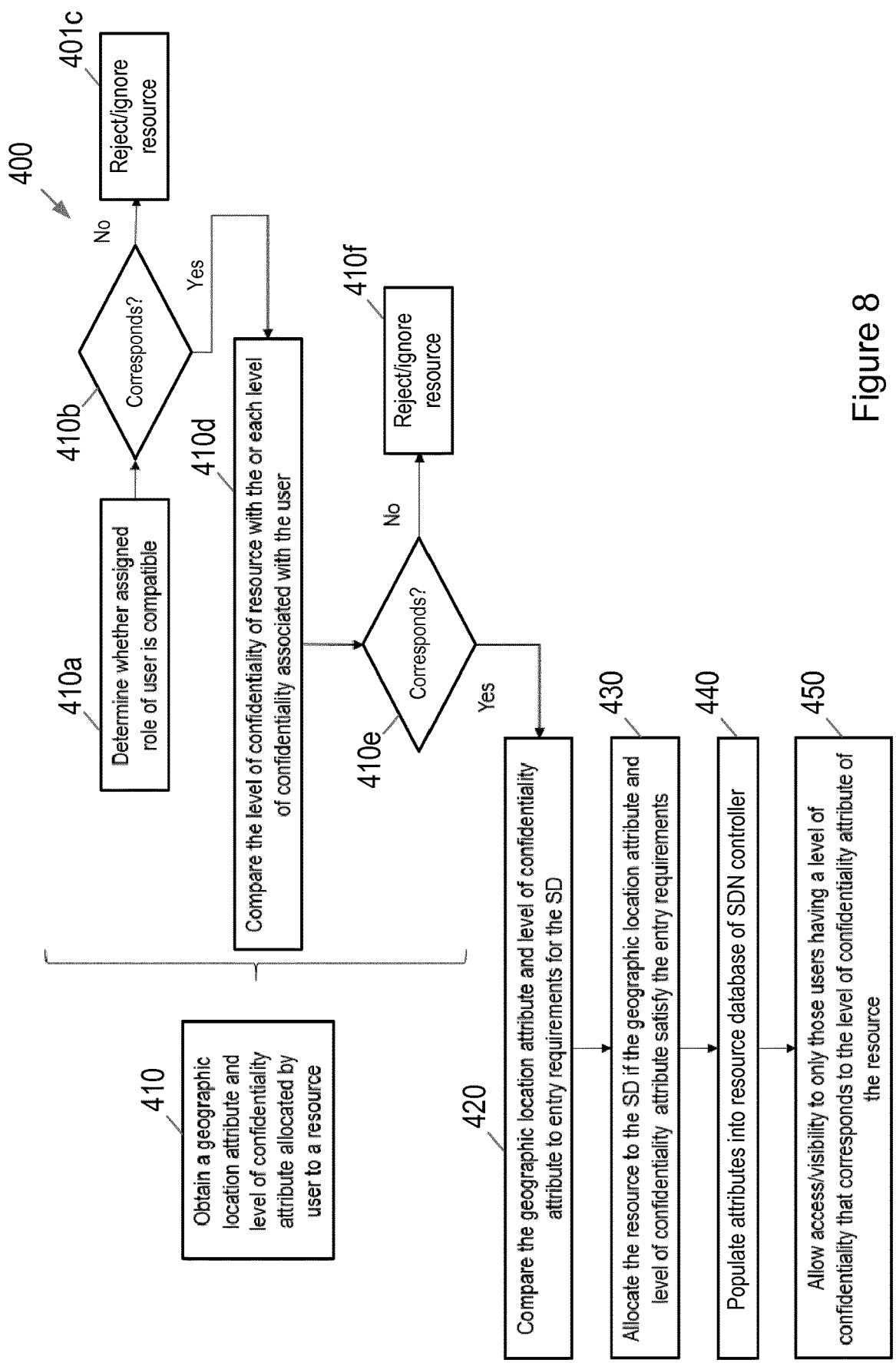
FIG. 8 is a flow chart illustrating process steps in another example of method for configuring a Secure Domain in a Software Defined Network.

FIG. 8 is a flow chart illustrating another example of method 400 for configuring a Secure Domain (SD) in an SDN. The method 400 of FIG. 8 is one example of the how the steps of the method 300 of FIG. 7 may be implemented and supplemented to achieve the above discussed and additional functionality. As in the case of the method 300 of FIG. 7, the method 400 of FIG. 8 may be conducted in an SDN controller.

The method 400 of FIG. 8 reintroduces the concept of levels of confidentiality, as discussed above. The method 400 of FIG. 8 also introduces the concept of user roles, which may be created within a hierarchy of roles including user and administrator roles. The hierarchy of roles may be organised such that administrator roles may have the authority to define users and their privileges, but may not themselves be authorised users. This Separation of Duty (SoD) ensures that only administrators may define users, but only users may actually access and modify objects within an SD. Together, the user and administrator roles and the geographic location and level of confidentiality attributes may be used to implement a model of "Role Based Access Control (RBAC) with attributes". This model complements that disclosed in PCT/EP2016/062068, according to which SDs may be configured within a NFVI. Aspects of the present disclosure enable corresponding levels of security to those disclosed in PCT/EP2016/062068 to be imposed for data being transported to, from and between SDs in the Network Functions Virtualisation domain via an SDN network.

Referring to FIG. 8, in a first step 410, the method 400 comprises obtaining a geographic location attribute and a level of confidentiality attribute allocated by a user to a resource. The resource may be a network element (NE) or may be a network link. As illustrated in FIG. 8, the step of obtaining the attributes may comprise a first sub-step 410a of determining whether an assigned role of the user is compatible with the allocation of the level of confidentiality attribute and the geographic location attribute. If the user role is compatible (step 410b—Yes) the method proceeds to step 410d. If the user role is not compatible (step 410b—No), the method proceeds to step 410c and the resource is rejected or ignored for the Secure Domain. The user role may be found to be incompatible if for example the assigned privileges for the role do not include configuring elements for the particular SD. Rejecting the resource may comprise actively communicating the rejection to the user who allocated the level of confidentiality, for example via a message. Ignoring the resource may comprise taking no further action in connection with configuring the resource for the SD.

Having checked the user role, the method then proceeds, at step 410d, to compare the level of confidentiality of the resource with the or each level of confidentiality associated with the user. If the level of confidentiality of the resource is within the permission sphere of the requesting user (step 410e—Yes), the method proceeds to step 420. If the level of confidentiality of the resource is not within the permission sphere of the requesting user (step 410e—No), the method proceeds to step 410f and rejects or ignores the resource for the SD. Rejecting the resource may comprise actively communicating the rejection to the user who allocated the level of confidentiality, for example via a message. Ignoring the resource may comprise taking no further action in connection with configuring the resource for the SD. In some examples of the present disclosure, it may be that users are prohibited from even attempting to assign a level of confidentiality that is outside their own permission sphere owing to the access and visibility restrictions imposed by the level of confidentiality attribute. For example, if resources having a level of confidentiality outside of a given user's permission sphere are not visible to that user, that user will not be in a position to attempt to allocate a level of confidentiality that is outside their own permission sphere. In such circumstances, the comparing steps 410d and 410e may be rendered unnecessary.

However, it may be appropriate to include such comparing steps as an additional security check, and to account for configurations in which access and/or visibility restrictions are not applied to an entire resource but only to specific attributes of the resource.

Referring still to FIG. 8, in step 420, the method comprises comparing the geographic location attribute and level of confidentiality attribute to entry requirements for the SD. Entry requirements for the SD may for example include a list of allowed territories or a list of excluded territories, and may also include a minimum level of confidentiality for objects allocated to the SD. In this manner, it may be ensured, for example, that all objects allocated to an SD afford a minimum level of security of data and are located within a particular geographic area. Data stored or transported within the SD is thus guaranteed not to leave the defined geographic area and is ensured the minimum level of security. The physical area may for example be a single national jurisdiction.

If the geographic location attribute and level of confidentiality attribute meet the entry requirements for the SD, the resource is allocated to the SD in step 430, and the attributes are populated into a resource database of the relevant SDN controller in step 440. The method further comprises allowing access to and/or visibility of the resource only to those users having a level of confidentiality that corresponds to the level of confidentiality attribute of the resource. In this manner, it may be ensured that only authorised users may see and/or manipulate the resource or its attributes.

An SD configured according to aspects of the present disclosure may be configured in accordance with the methods 300 and/or 400 to include a plurality of resources including NEs and network links. Each NE may comprise a plurality of physical ports which may be used to connect the NE to other NEs via network links. The network links may comprise cables spanning the physical distance separating the NEs. In some examples, ports of an NE may be exclusively assigned to a particular SD. However in many practical examples, an NE such as a router will not be assigned to just one SD but will be shared between multiple SDs. If the NE has a level of confidentiality assigned to it then it will be accessible only by users having the proper privileges, as discussed above. A grouping of NEs may be defined and referred to as a tenant, and may correspond to a particular owner or service provider.

Network Elements may thus belong to more than one SD at the same time. The geographic location attribute for the NE may be provided by the NE itself or may be provided by the owner of the NE during initial deployment of the NE. If the location information is not provided by the NE via a GPS or other automatic means of geographic localisation, the user that provides it must be a user with a level of confidentiality equal to or exceeding the level of all the SDN Datapaths in which the NE is involved.

Figure 9:
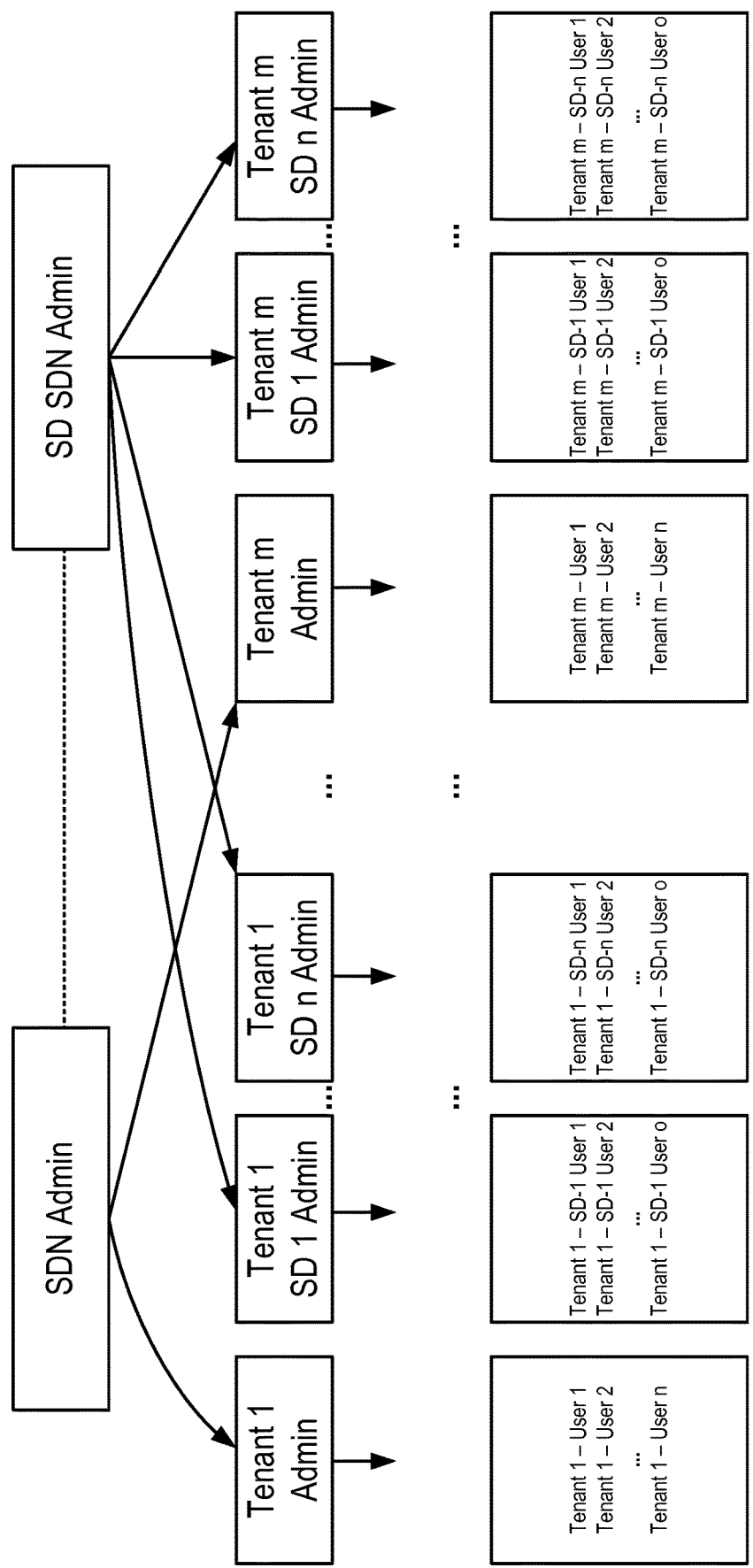
FIG. 9 is a block diagram illustrating domains within a Software Defined Network.

The authentication and user management of the method of FIG. 8 may be provided by one or more external systems which may manage the hierarchy of user and administrator roles discussed above, according to which administrators do not necessarily have the greatest privileges for manipulation of elements within an SD, but merely control the creation and privileges of user roles. According to some examples of the present disclosure, a plurality of separate SDs may be defined, each with its own hierarchy of user and administrator roles and its own scope, depending upon the level of confidentiality of the resources that belong to the SD, and thus on the sensitivity of information that may be stored in or transported on the network elements and links of the SD. Additional discussion of how hierarchy of roles and separation of duty may be defined can be found in PCT/EP2016/062068, which discusses these issues from the point of view of an SD defined within a Network Functions Virtualisation domain. FIG. 9 illustrates an example hierarchy of administrators and users for various domains, including Secure Domains. Access Control for the SDs is limited to the user and/or administrator roles defined as part of the SD. In the illustrated example, the resources of the SD may include network elements, network links and also parts of the Open Flow tables used to define the routing of the links belonging to the SD. The SD has an administrator whose role is limited to defining users and their privileges, while users are authorised to act on elements within the SD. The SD is enforced and implemented in all applications manipulating the SDN, in particular the SDN controllers and the PCE. The SD is defined consistently both in the Wide Area Network (WAN) and in the Data Centre (DC) internal network up to the site gateway routers.

In some examples of the present disclosure, the above discussed methods for configuring a Secure Domain may be implemented in one or more network slices. Network slices are virtual End-to-End networks including device, access, transport and core network elements, partitioned from a single physical network and having guaranteed dedicated resources. Network slices may be dedicated to different types of services with different characteristics and requirements, and may for example be dedicated to a particular client or business sector. In some examples, a single SD may be defined in a network slice, encompassing all or part of the slice. For example, a network slice may be configured for Lawful Intercept (LI), with a certain security level appropriate for LI being accorded to the entire slice. In other examples multiple SDs may be defined within a single slice, regardless of whether or not Quality of Service (QoS) or other characteristics may vary within the slice.

Figure 10:
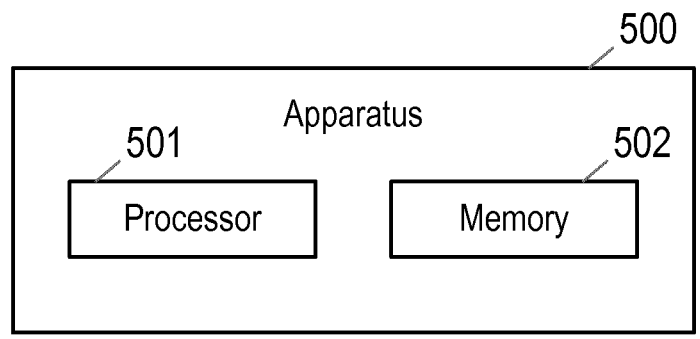
FIG. 10 is a block diagram illustrating functional units in an apparatus.

As discussed above, the methods 100, 200 may be carried out in an element having Traffic Engineering (TE) responsibility, such as a Path Computation Element (PCE). The methods 300, 400 may be carried out by an SDN controller. Each of the TE element or PCE and SDN controller may be implemented by an apparatus. FIG. 10 illustrates an example apparatus 500 which may implement a TE element such as a PCE or an SDN controller, and may thus carry out some or all of the steps if the methods 100, 200, 300, 400, for example on receipt of suitable instructions from a computer program. Referring to FIG. 10, the apparatus 500 comprises a processor 501 and a memory 502. The memory 502 contains instructions executable by the processor 501 such that the apparatus 500 is operative to conduct some or all of the steps of the methods 100, 200, 300 and/or 400.

Figure 11:
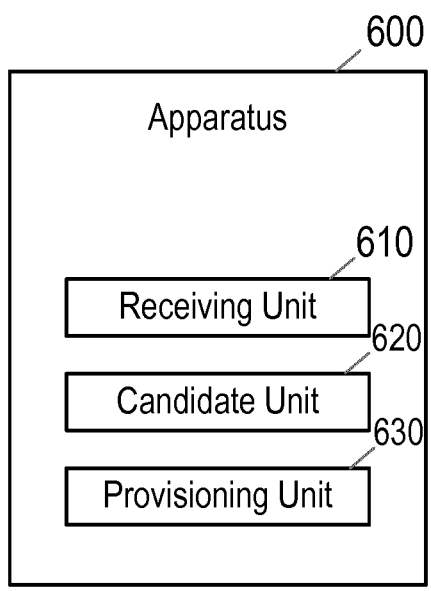
FIG. 11 is a block diagram illustrating functional units in another example of apparatus.

FIG. 11 illustrates functional units in an alternative example of apparatus 600 which may implement a TE element such as a PCE within an SDN, and may thus implement some or all of the steps of the methods 100, 200, for example on receipt of suitable instructions from a computer program. It will be appreciated that the units illustrated in FIG. 11 may be realised in any appropriate combination of hardware and/or software. For example, the units may comprise one or more processors and one or more memories containing instructions executable by the one or more processors. The units may be integrated to any degree.

Referring to FIG. 11, the apparatus 600 comprises a receiving unit 610 for receiving a user generated request to provision an SDN Datapath in the SDN, the request comprising performance metrics for the SDN Datapath and a geographic constraint to be applied to resources used in provisioning the SDN Datapath. The apparatus 600 further comprises a candidate unit 620, for assembling a candidate set of resources to provision the SDN Datapath, and a provisioning unit 630 for initiating provision of the SDN Datapath in accordance with the received performance metrics using resources selected from the candidate set. The candidate unit 620 is adapted to assemble the candidate set of NEs to provision the SDN Datapath by obtaining a geographic location attribute of resources in the SDN, and populating the candidate set with those resources having a geographic location attribute satisfying the received geographic constraint.

The candidate unit 620 may be adapted to obtain the geographic location attribute of resources in the SDN from an SDN controller of the SDN network. In examples of the disclosure, the request may further comprise a level of confidentiality to be applied to the SDN Datapath, and the candidate unit 620 may be further adapted to assemble the candidate set of resources by obtaining a level of confidentiality attribute of resources in the SDN, and populating the candidate set with those resources having a geographic location attribute satisfying the received geographic constraint and a level of confidentiality attribute in accordance with the level of confidentiality to be applied to the SDN Datapath. The candidate unit 620 may be adapted to obtain the level of confidentiality attribute from an SDN controller of the SDN network.

The provisioning unit 630 may be adapted to cause the level of confidentiality to be applied to the SDN Datapath to be stored in an SDN controller of the SDN network.

In examples of the disclosure, users of the SDN may be associated with at least one level of confidentiality, and the receiving unit 610 may be adapted to compare the level of confidentiality to be applied to the SDN Datapath with the or each level of confidentiality associated with the user generating the request. If the level of confidentiality to be applied to the SDN Datapath corresponds to at least one of the levels of confidentiality associated with the user generating the request, the receiving unit may be adapted to proceed to allow or instruct the candidate unit 620 to assemble a candidate set of resources to provision the SDN Datapath. If the level of confidentiality to be applied to the SDN Datapath does not correspond to a level of confidentiality associated with the user generating the request, the receiving unit 610 may be adapted to reject or ignore the request.

In some examples of the disclosure, the provisioning unit 630 may be adapted to initiate provision of the SDN Datapath in accordance with the received performance metrics by updating routing table entries for the appropriate resources, and to apply the level of confidentiality to be applied to the SDN Datapath to the updated routing table entries.

In some examples of the disclosure, the receiving unit 610 may be further adapted to establish a modification requirement for the requested SDN Datapath. If the modification requirement does not change the geographic constraint applied to the SDN Datapath, the provisioning unit 630 may be adapted to initiate provision of the SDN Datapath in accordance with the modification requirement using resources selected from the candidate set assembled by the candidate unit 620. If the modification requirement changes the geographic constraint applied to the SDN Datapath, the candidate unit 620 may be adapted to assemble a new candidate set of resources to provision the SDN Datapath in accordance with the changed geographic constraint, and the provisioning unit 630 may be adapted to initiate provision of the SDN Datapath in accordance with the modification requirement using resources selected from the new candidate set.

In some examples of the disclosure, the receiving unit 610 may be adapted to check a level of confidentiality of a user requesting modification of an SDN Datapath with a level of confidentiality applied to the SDN Datapath. The receiving unit 610 may be adapted to refuse or ignore a request for modification if the level of confidentiality to be applied to the SDN Datapath does not correspond to a level of confidentiality associated with the user requesting modification of the SDN Datapath.

Figure 12:
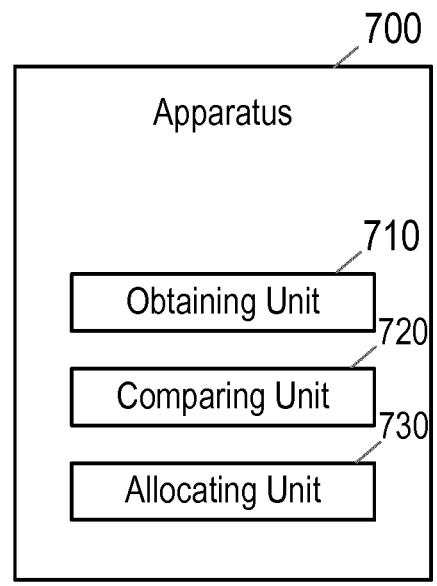
FIG. 12 is a block diagram illustrating functional units in another example of apparatus.

FIG. 12 illustrates functional units in an alternative example of apparatus 700 which may implement an SDN controller, and may thus implement some or all of the steps of the methods 300, 400, for example on receipt of suitable instructions from a computer program. It will be appreciated that the units illustrated in FIG. 12 may be realised in any appropriate combination of hardware and/or software. For example, the units may comprise one or more processors and one or more memories containing instructions executable by the one or more processors. The units may be integrated to any degree.

Referring to FIG. 12, the apparatus 700 comprises an obtaining unit 710 for obtaining a geographic location attribute for a resource, a comparing unit 720 for comparing the geographic location attribute to entry requirements for the SD, and an allocating unit 730 for allocating the resource to the SD if the geographic location attribute satisfies the entry requirements.

In some examples of the disclosure, the obtaining unit 710 may be adapted to obtain a level of confidentiality attribute for the resource and the comparing unit 720 may be adapted to compare the level of confidentiality attribute to entry requirements for the SD. The allocating unit 730 may be adapted to allocate the resource to the SD if the geographic location and the level of confidentiality attributes satisfy the entry requirements.

In some examples of the disclosure, the level of confidentiality attribute of a resource may be associated with at least one other attribute of the resource, such as for example the geographic location attribute of the resource.

According to examples of the disclosure, users of the SDN may be associated with at least one level of confidentiality, and the geographic location attribute and level of confidentiality attribute of a resource may be allocated to the resource by a user. The obtaining unit 710 may be further adapted to compare the level of confidentiality attribute of the resource to the or each level of confidentiality associated with the user and to reject or ignore the resource for the SD if the level of confidentiality attribute of the resource does not correspond to a level of confidentiality associated with the user generating the request.

If the resource is allocated to the SD, the allocating unit 730 may be adapted to allow access to the resource only to those users having an associated level of confidentiality that corresponds to the level of confidentiality attribute of the resource.

If the resource is allocated to the SD, the allocating unit 730 may be adapted to allow visibility of the resource only to those users having an associated level of confidentiality that corresponds to the level of confidentiality attribute of the resource.

In examples of the disclosure, the obtaining unit 710 may be further adapted to determine whether an assigned role of the user is compatible with configuring a resource for the SD and if the assigned role of the user is not compatible with configuring a resource for the SD, to reject or ignore the resource for the SD.

The allocating unit 730 may be further adapted to populate the geographic location attribute and the level of confidentiality attribute of the resource into a resource database of a controller of the SDN.

Aspects of the present invention enable improved control over the transport and storing of sensitive data; the use of a geographic location attribute for network resources enables both routing and Secure Domain (SD) configuration to ensure a physical location constraint is respected for sensitive data. Unauthorised access to an SD data stream, or to objects or object attributes within an SD, may be prevented by defining authorised users and their privileges as a part of the SD. Unauthorised access to or redirection of sensitive data may thus be avoided. A level of confidentiality attribute may also be defined for network resources and for network users, enabling different levels of sensitivity of data to be respected. The level of confidentiality attribute may also enable restriction of access to and visibility of network resources and/or their attributes to be enforced.

According to aspects of the present disclosure, user access to physical or logical ports for resources within an SD may be configured and password protected. Access to and/or visibility of certain resources or objects may be restricted according to different levels of confidentiality of resources and users. A Master Resource Database or Traffic Engineering Database may be enhanced with a level of confidentiality attribute and with a geographic location attribute of network resources, and a Path Computation Element or other Traffic Engineering element may be enhanced to enable filtering of network resources for a given SDN Datapath according to the geographic location attribute and the level of confidentiality attribute, such that data on the SDN Datapath may be guaranteed to remain within certain physical geographic boundaries and within resources having a given level of confidentiality.

Use cases which may be impacted by the methods and apparatus defined in the present disclosure include Virtual Link provisioning, Virtual Link planned path and link protection, and Virtual Link path modification owing to modifications on the availability of links within the network with dynamic calculation of alternative paths. Modifications of link availability may be caused by operation state changes or by modifications in the network causing new elements or links to become available. Operations which may be impacted within the above use cases include link instantiation, which may be conducted on the basis of respecting a geographic constraint for the link. In the event that the geographic constraint is modified for example by the addition of a site to a list of blacklisted sites, some or all existing paths may become invalid and need recalculation. Such analysis may also generate new paths where existing paths fail to satisfy the revised geographic constraint.

New links may be added within an existing location if requested for example by national regulation authorities. An appropriate location parameter may be selected when input from the TED or MRDB is requested by the PCE. Geographic location attributes may include the country or countries in which a resource is located and coordinates or GPS settings may additionally or alternatively be included. Existing operations supported by Software Defined Networking may be supported in accordance with the present disclosure, with for example the creation or modification of trace and tapping functions being permitted only to authorised SD users.

Advantages of the present invention include the ability to control resource selection for an SDN Datapath according to specific geographic areas, with geographic attribute information being available in the TED or MRDB. Specific positive or negative conditions may be respected, including lists of allowed or blacklisted countries, which lists may be dynamically updated. The methods of the present disclosure may also be extended to handle individual blacklisted sites or network elements. It may thus be ensured that data on an SDN Datapath never crosses national boundaries. Software Defined Networking affords a high degree of flexibility as well as the possibility to change paths on the fly and to create network slices dynamically. Examples of the present disclosure can ensure that such functionality is enhanced with the ability to secure data that is transferred on a particular SDN Datapath by controlling both the physical location of the Datapath and access to and/or visibility of resources used to provision the Datapath.

Examples of the present disclosure also ensure that sensitive data in a configured Secure Domain (SD) may only be accessed by authorised users defined as a part of the SD. Any change in the physical location of a virtual object may be identified through examination of geographic location attribute data. Any standards using a TED or MRDB and a PCE of other TE element may be encompassed by examples of the present disclosure.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a Software Defined Network, SDN, the SDN comprising a plurality of resources including Network Elements, NEs, and network links connecting the NEs, the method comprising:
receiving a user generated request to provision an SDN Datapath in the SDN, the request comprising performance metrics for the SDN Datapath and a geographic constraint to be applied to resources used in provisioning the SDN Datapath;
assembling a candidate set of resources to provision the SDN Datapath; and
initiating provision of the SDN Datapath in accordance with the received performance metrics using resources selected from the candidate set;
wherein assembling a candidate set of resources to provision the SDN Datapath comprises:
obtaining a geographic location attribute of resources in the SDN;
populating the candidate set with those resources having a geographic location attribute satisfying the received geographic constraint; and
wherein at least one of the NEs of the SDN network is implemented via a Virtualised Network Function, VNF, and wherein the geographic location attribute of the NE implemented via a VNF comprises an indication of the physical location of hardware provisioning the VNF.

2. A method as claimed in claim 1, wherein the geographic location attribute of resources in the SDN is obtained from an SDN controller of the SDN network.

3. A method as claimed in claim 1, wherein the request further comprises a level of confidentiality to be applied to the SDN Datapath, and wherein assembling a candidate set of resources to provision the SDN Datapath further comprises:
obtaining a level of confidentiality attribute of resources in the SDN; and
populating the candidate set with those resources having a geographic location attribute satisfying the received geographic constraint and a level of confidentiality attribute in accordance with the level of confidentiality to be applied to the SDN Datapath.

4. A method as claimed in claim 3, wherein the level of confidentiality attribute of resources in the SDN is obtained from an SDN controller of the SDN network.

5. A method as claimed in claim 3, further comprising:
causing the level of confidentiality to be applied to the SDN Datapath to be stored in an SDN controller of the SDN network.

6. A method as claimed in claim 3, wherein users of the SDN are associated with at least one level of confidentiality, the method further comprising, on receipt of the user generated request to provision an SDN Datapath in the SDN:
comparing the level of confidentiality to be applied to the SDN Datapath with each level of confidentiality associated with the user generating the request; and
if the level of confidentiality to be applied to the SDN Datapath corresponds to at least one of the levels of confidentiality associated with the user generating the request, proceeding to assemble a candidate set of resources to provision the SDN Datapath.

7. A method as claimed in claim 3, wherein initiating provision of the SDN Datapath in accordance with the received performance metrics using resources selected from the candidate set comprises updating routing table entries for the resources, and wherein the method further comprises:
applying the level of confidentiality to be applied to the SDN Datapath to the updated routing table entries.

8. A method as claimed in claim 7, wherein users of the SDN are associated with at least one level of confidentiality, and wherein applying the level of confidentiality to be applied to the SDN Datapath to the updated routing table entries comprises allowing access to the updated routing table entries to only those users having an associated level of confidentiality that corresponds to the level of confidentiality to be applied to the SDN Datapath.

9. A method as claimed in claim 7, wherein users of the SDN are associated with at least one level of confidentiality, and wherein applying the level of confidentiality to be applied to the SDN Datapath to the updated routing table entries comprises allowing visibility of the updated routing table entries to only those users having an associated level of confidentiality that corresponds to the level of confidentiality to be applied to the SDN Datapath.

10. A method as claimed in claim 1, further comprising:
establishing a modification requirement for the requested SDN Datapath; and
modifying the SDN Datapath by:
if the modification requirement does not change the geographic constraint applied to the SDN Datapath, initiating provision of the SDN Datapath in accordance with the modification requirement using resources selected from the candidate set; and
if the modification requirement changes the geographic constraint applied to the SDN Datapath, assembling a new candidate set of resources to provision the SDN Datapath in accordance with the changed geographic constraint; and initiating provision of the SDN Datapath in accordance with the modification requirement using resources selected from the new candidate set.

11. Apparatus for a Software Defined Network, SDN, the SDN comprising a plurality of resources including Network Elements, NEs, and network links connecting the NEs, the apparatus comprising a processor and a memory, the memory containing instructions executable by the processor such that the apparatus is operative to:
receive a user generated request to provision an SDN Datapath in the SDN, the request comprising performance metrics for the SDN Datapath and a geographic constraint to be applied to resources used in provisioning the SDN Datapath;
assemble a candidate set of resources to provision the SDN Datapath; and
initiate provision of the SDN Datapath in accordance with the received performance metrics using resources selected from the candidate set;
wherein assembling a candidate set of resources to provision the SDN Datapath comprises:
obtaining a geographic location attribute of resources in the SDN;
populating the candidate set with those resources having a geographic location attribute satisfying the received geographic constraint; and
wherein at least one of the NEs of the SDN network is implemented via a Virtualised Network Function, VNF, and wherein the geographic location attribute of the NE implemented via a VNF comprises an indication of the physical location of hardware provisioning the VNF.

12. Apparatus as claimed in claim 11, wherein the request further comprises a level of confidentiality to be applied to the SDN Datapath, and wherein the apparatus is further operative to assemble a candidate set of resources to provision the SDN Datapath by:
obtaining a level of confidentiality attribute of resources in the SDN; and
populating the candidate set with those resources having a geographic location attribute satisfying the received geographic constraint and a level of confidentiality attribute in accordance with the level of confidentiality to be applied to the SDN Datapath.

13. Apparatus as claimed in claim 12, wherein users of the SDN are associated with at least one level of confidentiality, and wherein the apparatus is further operative to, on receipt of the user generated request to provision an SDN Datapath in the SDN:
compare the level of confidentiality to be applied to the SDN Datapath with each level of confidentiality associated with the user generating the request; and
if the level of confidentiality to be applied to the SDN Datapath corresponds to at least one of the levels of confidentiality associated with the user generating the request, proceed to assemble a candidate set of resources to provision the SDN Datapath.

* * * * *